United States Patent
Yamada et al.

(10) Patent No.: US 11,716,767 B2
(45) Date of Patent: *Aug. 1, 2023

(54) MOBILE STATION APPARATUS AND METHOD TO PERFORM A RANDOM ACCESS USING A RANDOMLY SELECTED SIGNATURE IN A CELLULAR COMMUNICATION SYSTEM

(71) Applicant: SHARP KABUSHIKI KAISHA, Sakai (JP)

(72) Inventors: Shohei Yamada, Sakai (JP); Yasuyuki Kato, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,252

(22) Filed: Sep. 1, 2021

(65) Prior Publication Data

US 2021/0400735 A1    Dec. 23, 2021

Related U.S. Application Data

(60) Continuation of application No. 16/168,579, filed on Oct. 23, 2018, now Pat. No. 11,129,198, which is a
(Continued)

(30) Foreign Application Priority Data

Jun. 6, 2007    (JP) ................................. 2007-150992
Jan. 31, 2008   (JP) ................................. 2008-021557

(51) Int. Cl.
*H04W 4/00*     (2018.01)
*H04W 74/08*    (2009.01)
(Continued)

(52) U.S. Cl.
CPC ....... *H04W 74/0833* (2013.01); *H04L 5/0057* (2013.01); *H04W 74/008* (2013.01); *H04W 74/0866* (2013.01); *H04W 72/20* (2023.01)

(58) Field of Classification Search
CPC .......... H04W 74/0833; H04W 5/0057; H04W 74/008; H04W 72/0406
See application file for complete search history.

(56) References Cited

U.S. PATENT DOCUMENTS 5,420,864 A * 5/1995 Dahlin .............. H04W 74/0833
                                                  370/347
5,822,311 A * 10/1998 Hassan ................ H04B 7/2125
                                                  370/347
(Continued)

FOREIGN PATENT DOCUMENTS

CN      101155415 A    4/2008
CN      101653036 A    2/2010
(Continued)

OTHER PUBLICATIONS

3GPP TR 25.814, V7.0.0 (Jun. 2006), 3rd Generation Partnership Project; Technical Specification Group Radio Access Network; Physical layer Aspects for Evolved Universal Terrestrial Radio Access (UTRA) (Release 7), pp. 1-126.
(Continued)

*Primary Examiner* — Abdelnabi O Musa
(74) *Attorney, Agent, or Firm* — Birch, Stewart, Kolasch & Birch, LLP

(57) ABSTRACT

A mobile station apparatus detects a signature not reserved as a dedicated signature informed by a base station. In addition, the mobile station apparatus performs a random access using a randomly selected signature, in case of detecting a signature not reserved as a dedicated signature.

18 Claims, 20 Drawing Sheets

Related U.S. Application Data division of application No. 14/678,498, filed on Apr. 3, 2015, now Pat. No. 10,123,354, which is a continuation of application No. 14/050,116, filed on Oct. 9, 2013, now Pat. No. 9,042,307, which is a division of application No. 12/593,884, filed as application No. PCT/JP2008/060184 on Jun. 3, 2008, now Pat. No. 8,588,134.

(51) Int. Cl.
*H04W 74/00* (2009.01)
*H04L 5/00* (2006.01)
*H04W 72/20* (2023.01)

(56) References Cited

U.S. PATENT DOCUMENTS

| | | | | |
|---|---|---|---|---|
| 6,597,675 | B1* | 7/2003 | Esmailzadeh | H04J 13/107 |
| | | | | 370/335 |
| 6,707,807 | B1* | 3/2004 | Menzel | H04W 56/0085 |
| | | | | 370/335 |
| 8,014,359 | B2* | 9/2011 | Cave | H04W 72/0446 |
| | | | | 370/332 |
| 2003/0096631 | A1 | 5/2003 | Kayama et al. | |
| 2004/0184421 | A1* | 9/2004 | Hondo | H04W 74/002 |
| | | | | 370/341 |
| 2006/0292992 | A1* | 12/2006 | Tajima | H04W 74/0866 |
| | | | | 455/67.11 |
| 2007/0259675 | A1 | 11/2007 | Worrall | |
| 2007/0293224 | A1 | 12/2007 | Wang et al. | |
| 2008/0043658 | A1 | 2/2008 | Worrall | |
| 2008/0056193 | A1 | 3/2008 | Bourlas et al. | |
| 2008/0165717 | A1 | 7/2008 | Chen et al. | |
| 2008/0267131 | A1* | 10/2008 | Kangude | H04W 36/0072 |
| | | | | 370/350 |
| 2009/0238122 | A1 | 9/2009 | Vukovic et al. | |
| 2009/0323607 | A1 | 12/2009 | Park et al. | |
| 2010/0009684 | A1 | 1/2010 | Du | |
| 2010/0105405 | A1* | 4/2010 | Vujcic | H04J 13/22 |
| | | | | 455/452.1 |
| 2010/0113081 | A1 | 5/2010 | Ishii et al. | |
| 2010/0189071 | A1 | 7/2010 | Kitazoe | |
| 2010/0323736 | A1* | 12/2010 | Fischer | H04W 74/0866 |
| | | | | 455/509 |

FOREIGN PATENT DOCUMENTS

| | | |
|---|---|---|
| CN | 101467477 B | 8/2013 |
| EP | 0 993 211 A1 | 4/2000 |
| JP | 2003-163962 A | 6/2003 |
| JP | 2007-006080 A | 1/2007 |
| WO | WO 2007/052811 A1 | 5/2007 |

OTHER PUBLICATIONS

3GPP TS 36.300, V0.9.0 (Mar. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-82.
3GPP TSG RAN WG1 #42 on LTE (Original R1-050591), London, UK, Aug. 29-Sep. 2, 2005, ppl. 1-14, R-050850.
3GPP TSG RAN WG2 #54, Aug. 28-Sep. 1, 2006, Tallinn, Estonia, R2-062165, 3 pages.
3GPP TSG RAN WG2 #56, Nov. 6-10, 2006, Riga, Latvia, R2-063401, 3 pages.
3GPP TSG RAN WG2 #58, Kobe, japan, May 7-11, 2007, R2-072090, pp. 1-6.
3GPP TSG-RAN2 Meeting #57, St. Louis, USA, Feb. 12-16, 2007, Tdoc, R2-070687, pp. 1-4.
3rd Generation Partnership Project (3GPP) Draft, R2-071712 Stage 2 Update, vol. RAN WG2, Kobe, Japan, May 4, 2007, XP050134631.
3rd Generation Partnership Project (3GPP) Draft, R2-072131, vol. RAN WG2, Kobe, Japan, May 4, 2007, XP050134990.
Docomo et al., 3rd Generation Partnership Project (3GPP) Draft, "Contention-based and contention-free access procedures in LTE", R2-071299, vol. RAN WG2, St. Julian, Mar. 22, 2007, XP050134254.
Docomo et al., 3rd Generation Partnership Project (3GPP) Draft, "Uplink synchronization", R2-070781, St. Louis, vol. RAN WG2, Feb. 9, 2007. XP050133807.
U.S. Advisory Action issued in U.S. Appl. No. 12/593,884 dated Dec. 19, 2012.
U.S. Final Office Action issued in U.S. Appl. No. 14/050,116 dated Oct. 16, 2014.
U.S. Notice of Allowance issued in U.S. Appl. No. 12/593,884 dated Jul. 22, 2013.
U.S. Notice of Allowance issued in U.S. Appl. No. 14/050,116 dated Jan. 9, 2015.
U.S. Office Action issued in U.S. Appl. No. 12/593,884 dated Jul. 7, 2011.
U.S. Office Action issued in U.S. Appl. No. 12/593,884 dated May 28, 2010.
U.S. Office Action issued in U.S. Appl. No. 12/593,884 dated Oct. 16, 2012.
U.S. Office Action issued in U.S. Appl. No. 12/593,884 dated Oct. 17. 2011.
U.S. Office Action issued in U.S. Appl. No. 14/050,116 dated Jul. 31, 2014.
3GPP, "Universal Mobile Telecommunications System (UMTS); Radio Resource Control (RRC); Protocol specification," 3GPP TS 25.331 V 5.19.0 Release 5. ETSI TS 125 331 V5.19.0, Dec. 2006, pp. 341-342 (2 pages total).
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN)," 3GPP TS 36.300 vol. 0.3.1, Nov. 2006, 72 pages total.
3GPP, "3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V1.0.0, Sep. 2007, 18 pages total.
3GPP, "Universal Mobile Telecommunications System (UMTS); Physical layer procedures (FDD)," ETSI TS 125 214 V3.1.1, 2000, 4 pages total.
3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V1.0.0 (Sep. 2007), pp. 1-18.
Asustek, "Issues related to RACH Access," 3GPP TSG-RAN WG2 #58, R2-072048, Kobe, Japan, May 15, 2007.
Blogh et al, "Third-Generation Systems and Intelligent Wireless Networking," IEEE Press, IEEE Communications Society, Sponsor, 2002, 11 pages total.
Ericsson, "On the details of the dedicated preamble at intra-LTE handover," 3GPP TSG-RAN WG2 #58, Kobe, Japan, May 7-11, 2007, R2-071820, 3 pages total.
Ericsson, "Random access with dedicated preambles at handover," 3GPP TSG-RAN WG2 #57bis, St Julian's, Malta, Mar. 26-30, 2007, R2-071422, 2 pages total.
Etri, "Non-contention based RA preamble." 3GPP TSG RAN WG2 #57bis, St. Julian's, Malta, Mar. 26-30, 2007, R2-071303, 2 pages total.
Examiner's Answer issued in U.S. Appl. No. 14/678,498 dated Aug. 14, 2017.
MAC Rapporteurs, "36.321 CR covering agreements of RAN #61 and RAN2#62," 3GPP TSG-RAN2 Meeting #62, R2-082902, Kansas City, USA, May 8, 2008.
Masson, "E-UTRA RACH within the LTE system," Master's Degree Project, Stockholm, Sweden, 2006, 8 pages total.
Nokia Semens Networks, "Update on Mobility, Security, Random Access Procedure, etc . . . ," 3GPP TSG-RAN2 Meeting #58, R2-072338, Kobe, Japan, May 4, 2007.

(56) References Cited

OTHER PUBLICATIONS

Panasonic, "Random Access Preamble signatures usage," 3GPP TSG RAN WG2 #57bis, R2-071143, St. Julians, Malta, Mar. 22, 2007.
Texas Instruments, Inc., "A Pre-synchronization method for E-UTRA Handovers," 3GPP TSG RAN WG2 Meeting #58, R2-071684, Kobe, Japan, May 4, 2007.
Texas Instruments, Inc., "Optimized HO method for reducing latencies in UL synchronization and initial UL allocation in E-UTRA," 3GPP TSG RAN WG2 Meeting #57bis, R2-071269, St. Julians, Malta, Mar. 22, 2007.
U.S. Advisory Action issued in U.S. Appl. No. 14/678,498 dated Apr. 5, 2017.
U.S. Advisory Action issued in U.S. Appl. No. 16/168,579 dated Sep. 29, 2020.
U.S. Final Office Action issued in U.S. Appl. No. 14/678,498, dated Jan. 4, 2017.
U.S. Notice of Allowance issued in U.S. Appl. No. 14/678,498, dated Jun. 27, 2018.
U.S. Notice of Allowance issued in U.S. Appl. No. 16/168,579 dated May 18, 2021.
U.S. Office Action issued in U.S. Appl. No. 16/168,579 dated Jul. 2, 2020.
U.S. Office Action issued in U.S. Appl. No. 14/678,498, dated Aug. 24, 2016.
U.S. Office Action issued in U.S. Appl. No. 14/678,498, dated Dec. 19, 2017.
U.S. Office Action issued in U.S. Appl. No. 16/168,579 dated Jan. 1, 2021.
U.S. Office Action issued in U.S. Appl. No. 16/168,579 dated Nov. 5, 2019.
ZTE, "Intra-LTE handover procedure by using dedicated signature," TSG-RAN Working Group 2 meeting #56bis, R2-070029, Sorrento, Italy, Jan. 12, 2007.

\* cited by examiner

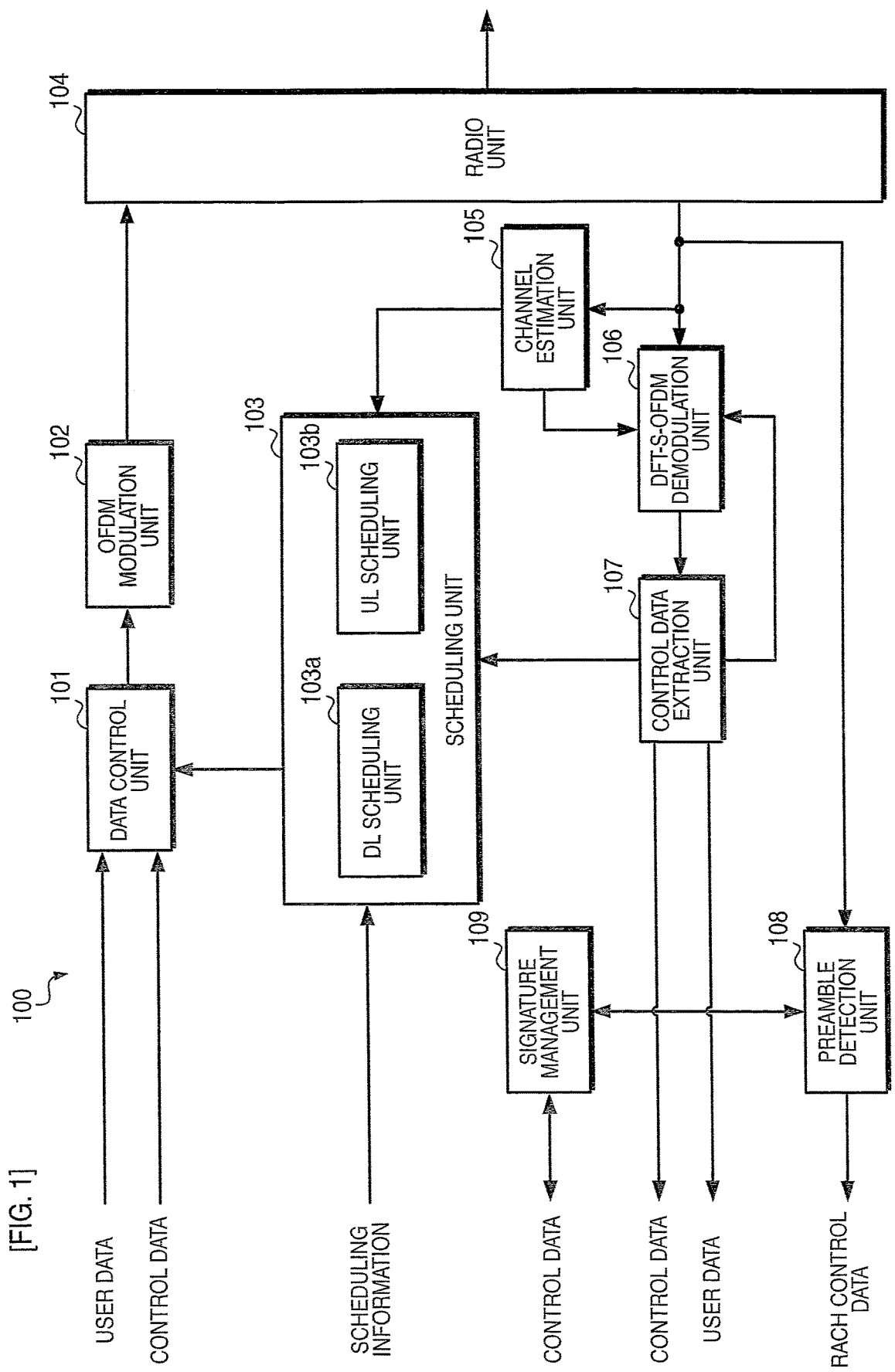
[FIG. 1]

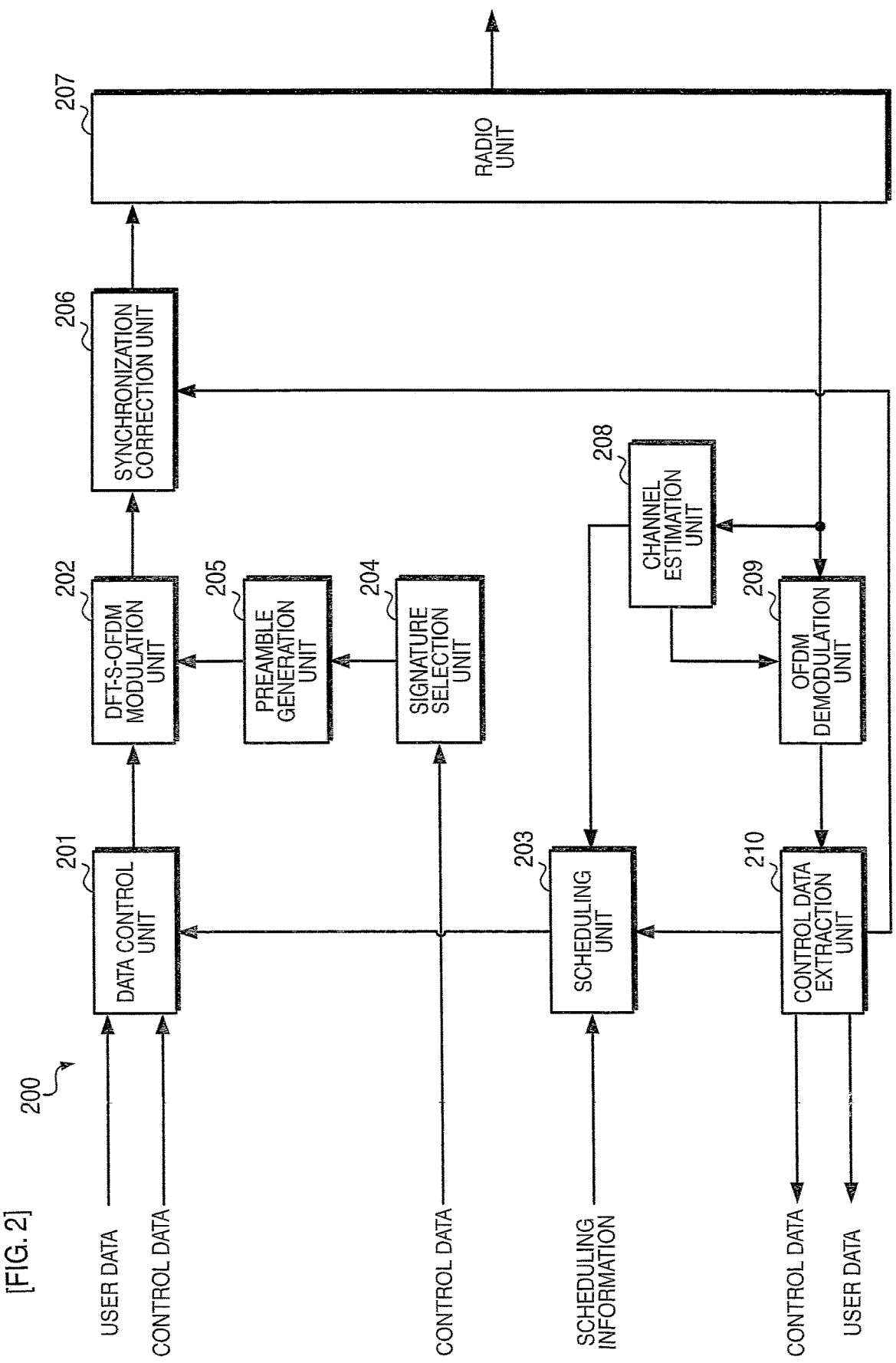
[FIG. 2]

[FIG. 3]
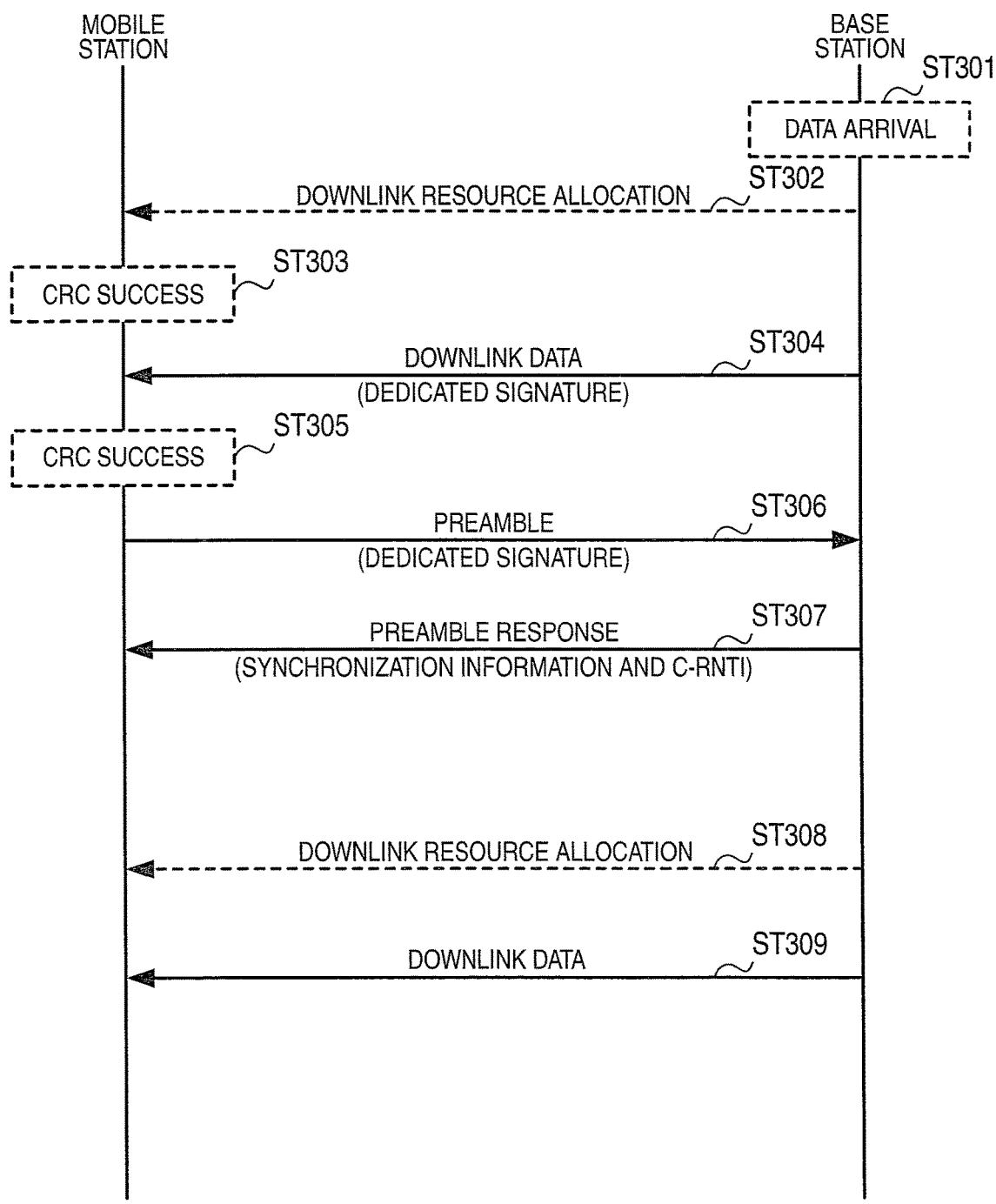

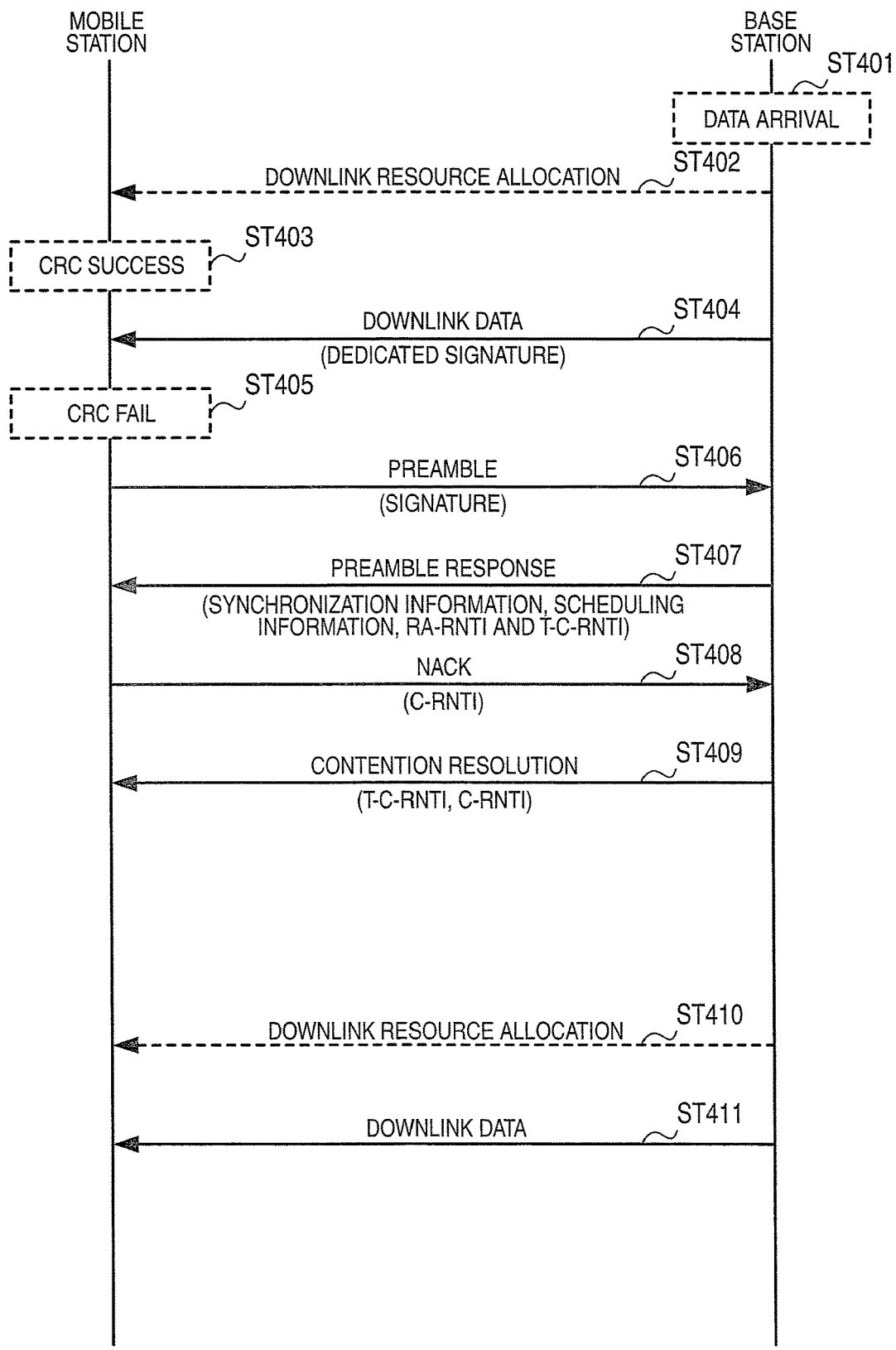
[FIG. 4]

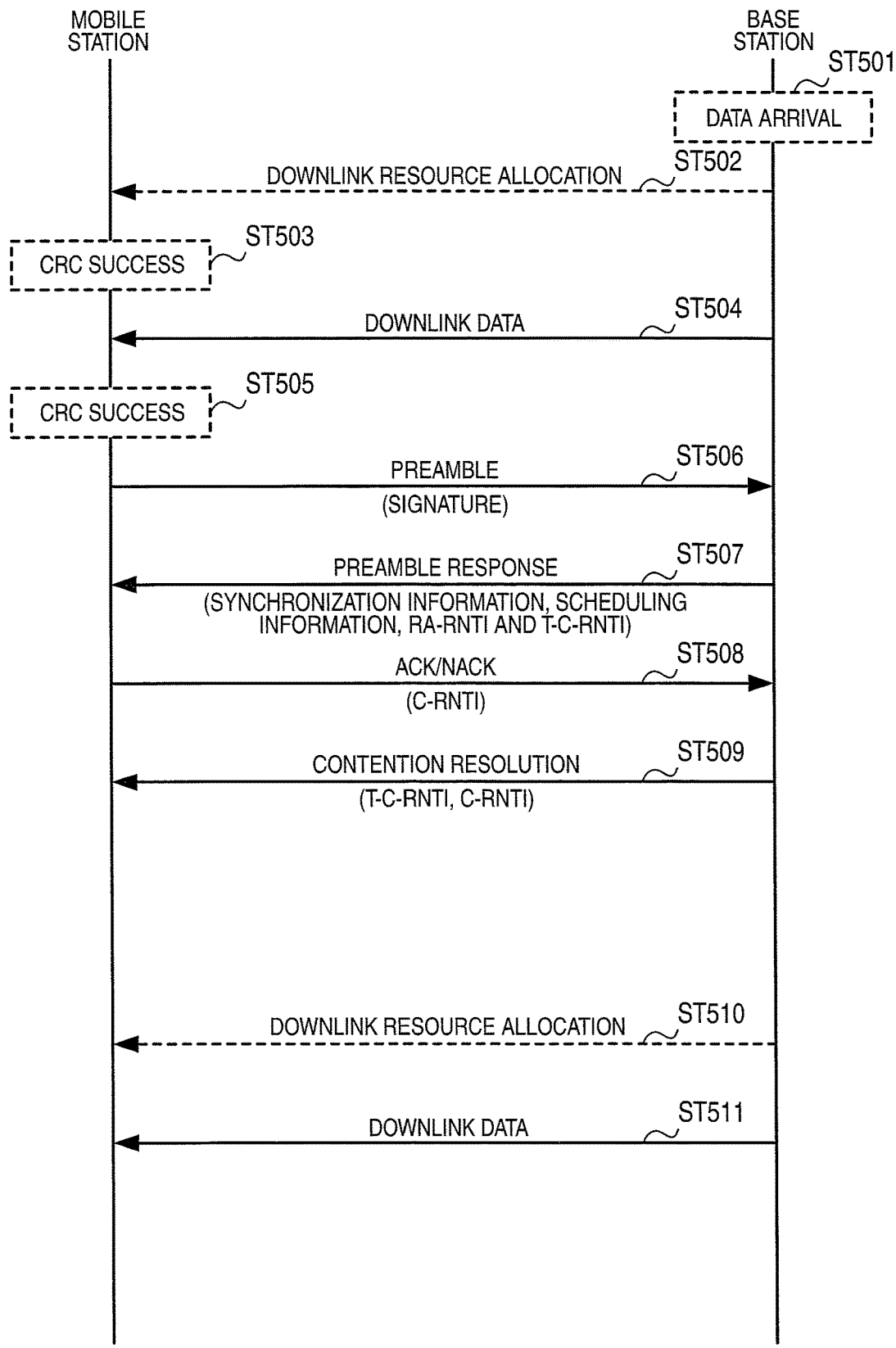
[FIG. 5]

[FIG. 6]
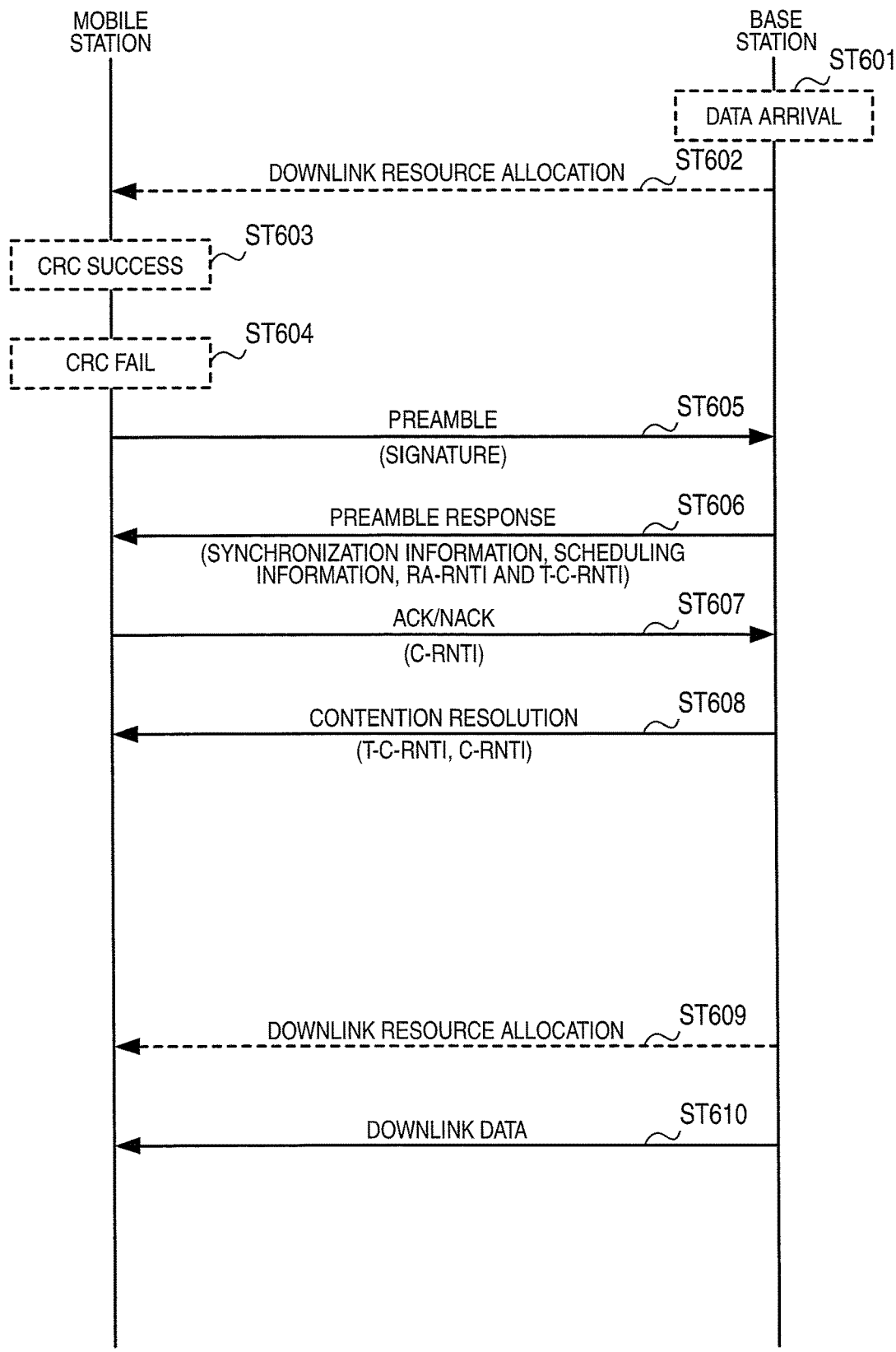

[FIG. 7]
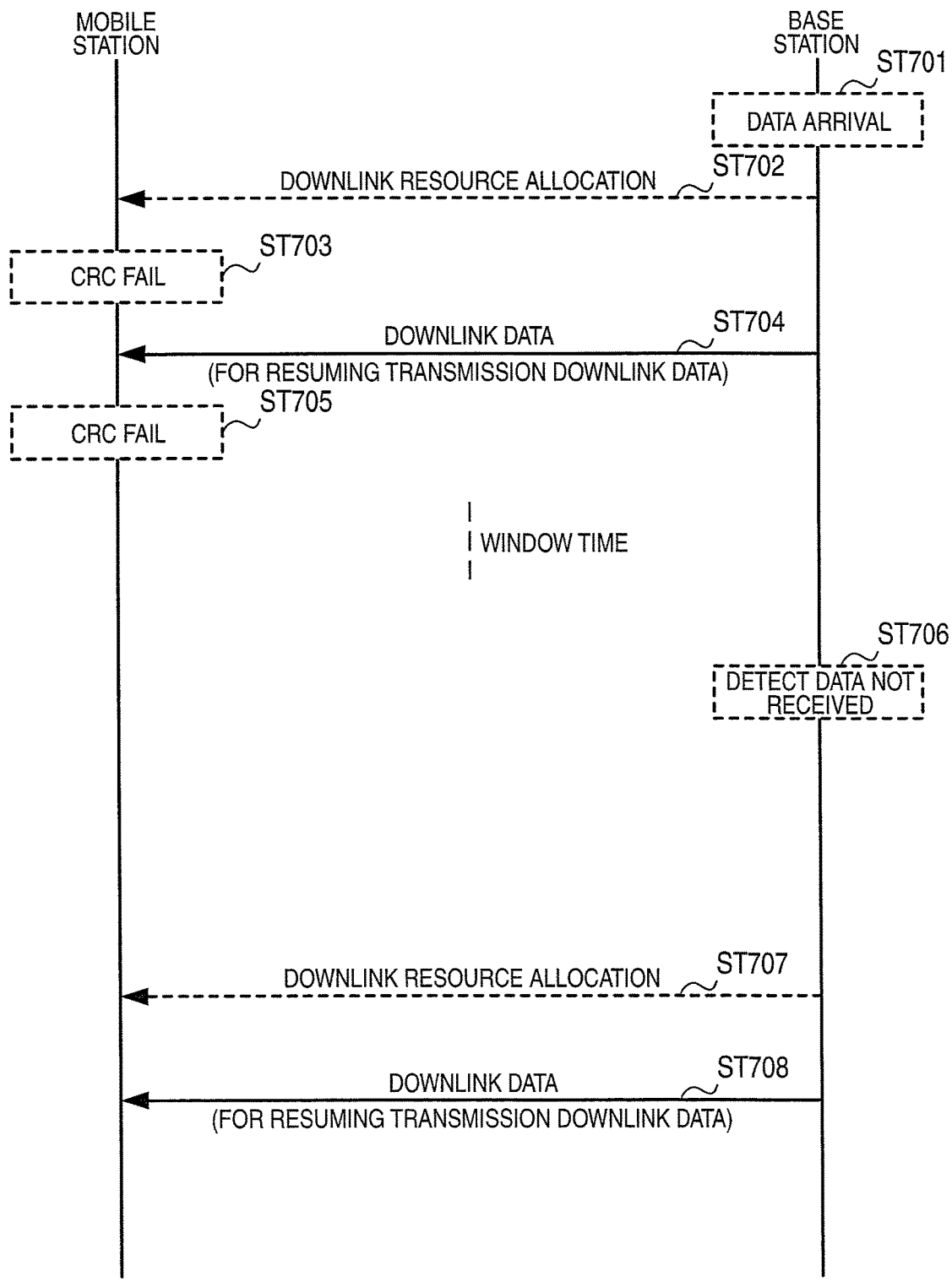

[FIG. 8]
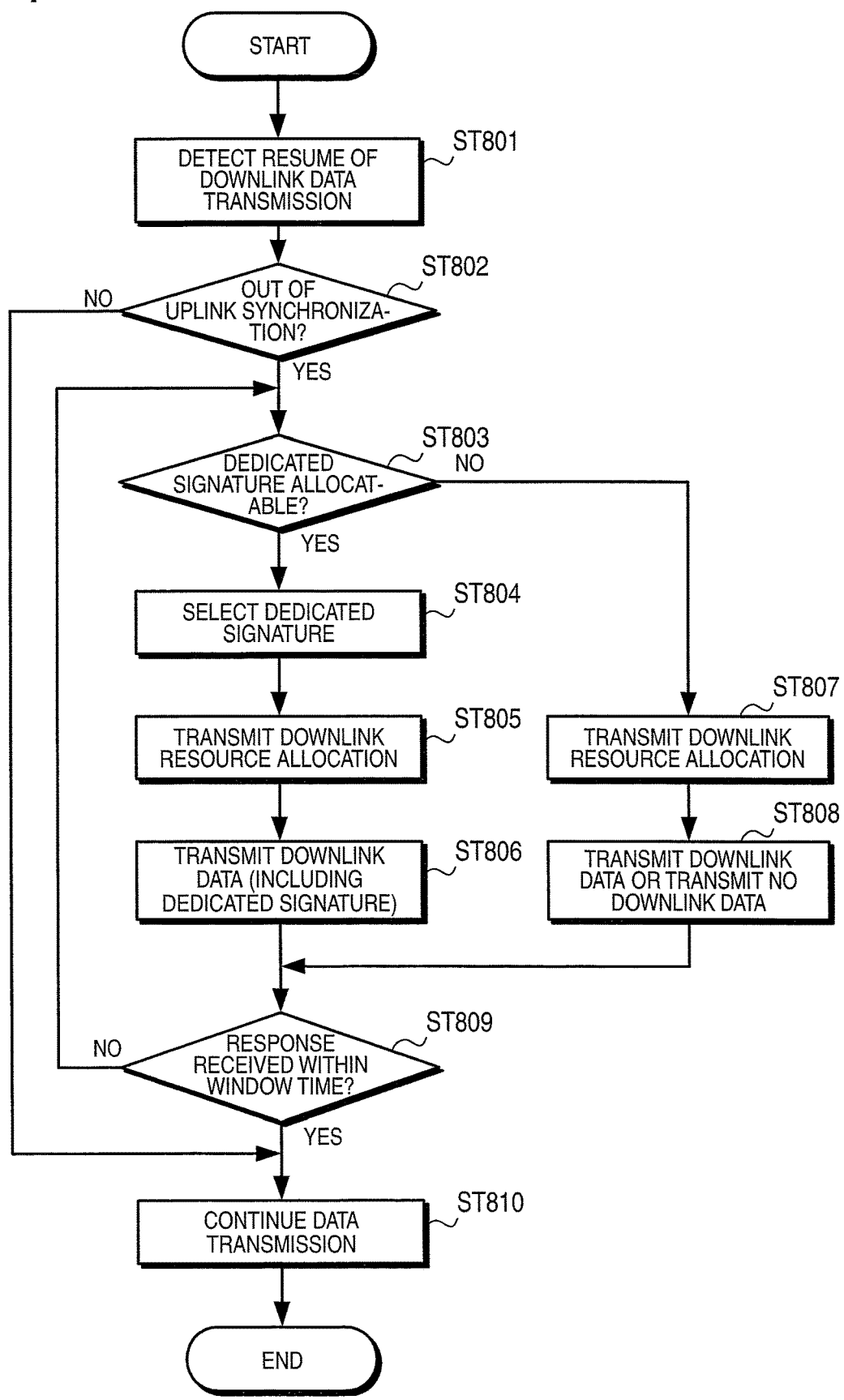

[FIG. 9]
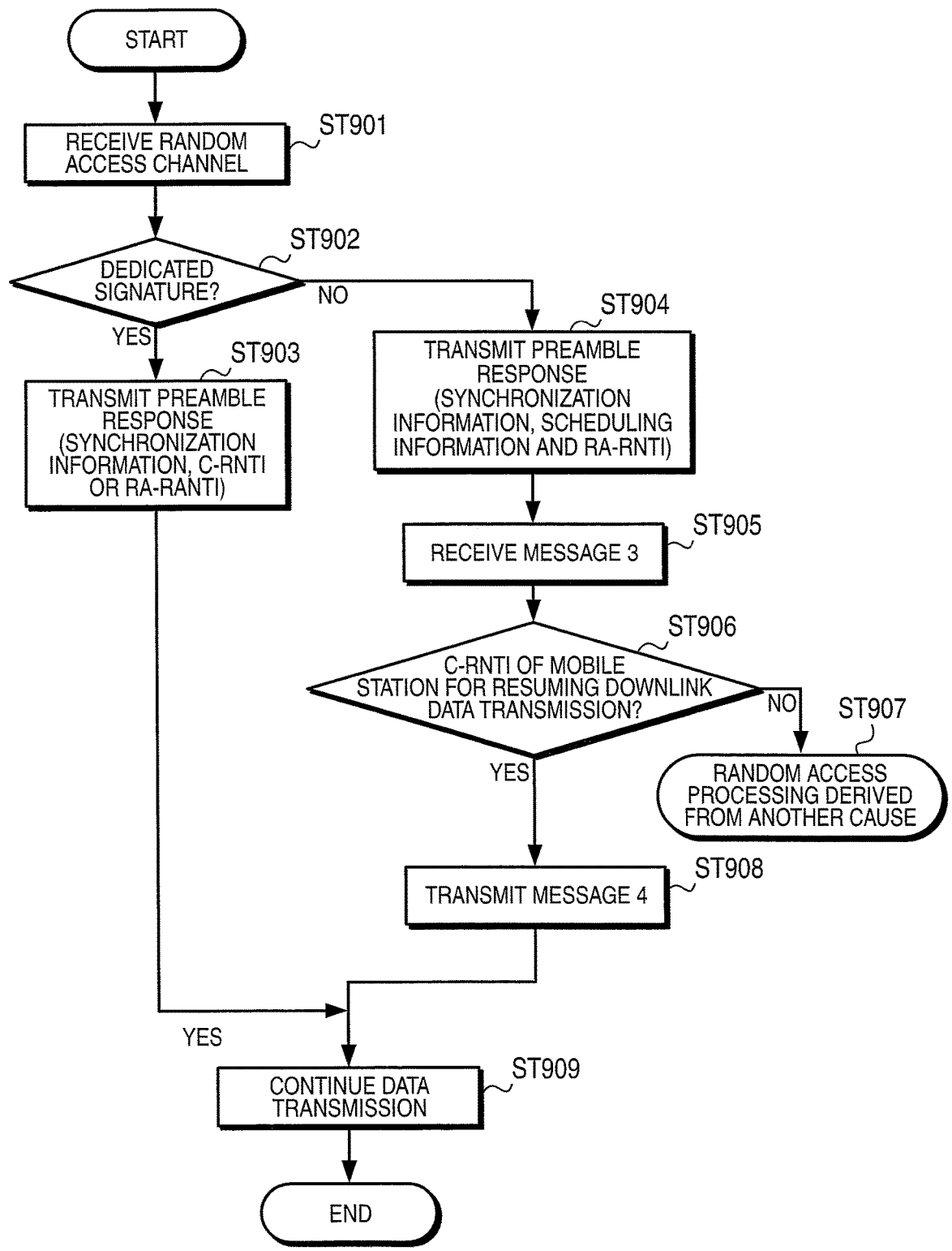

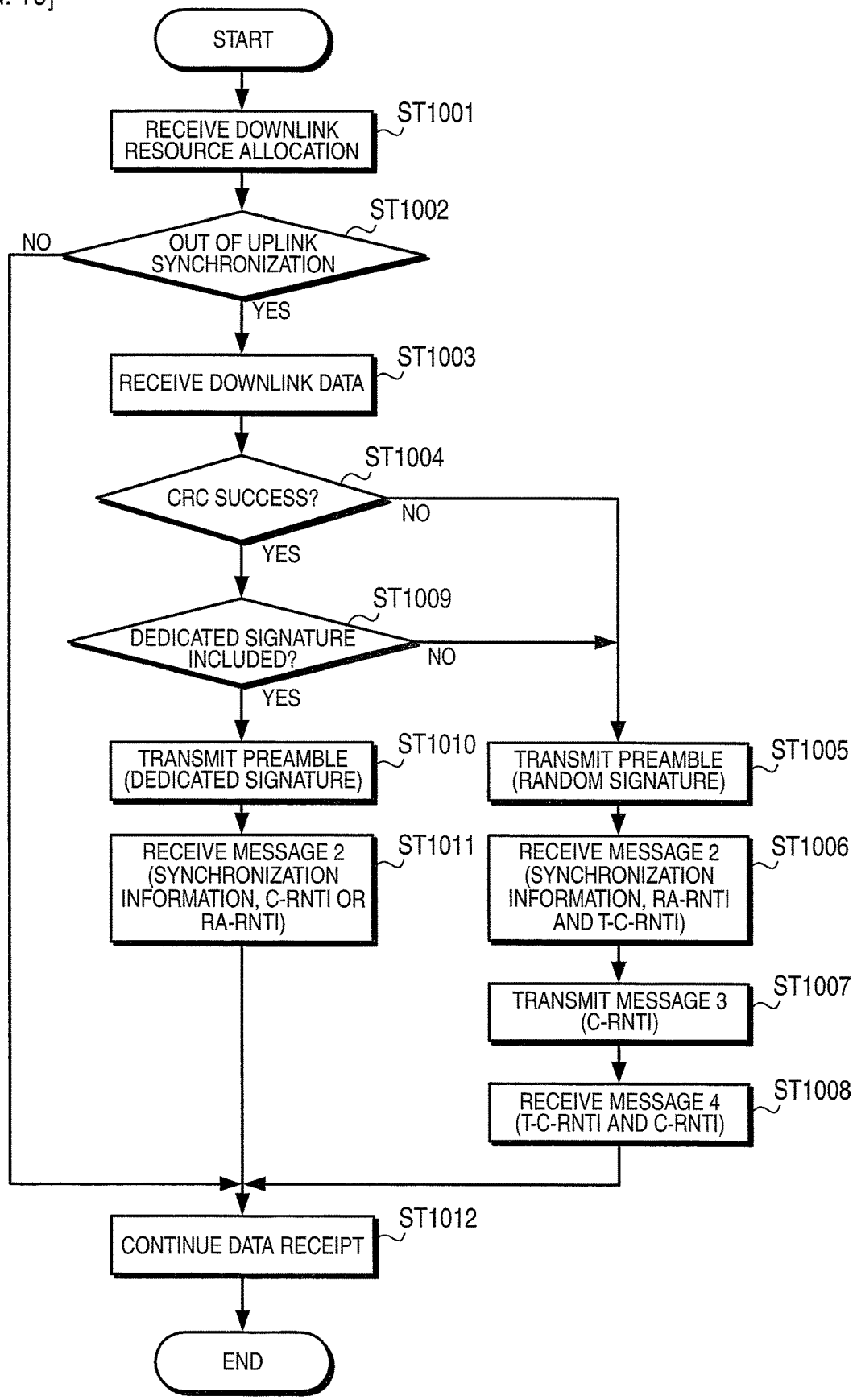

[FIG. 11]
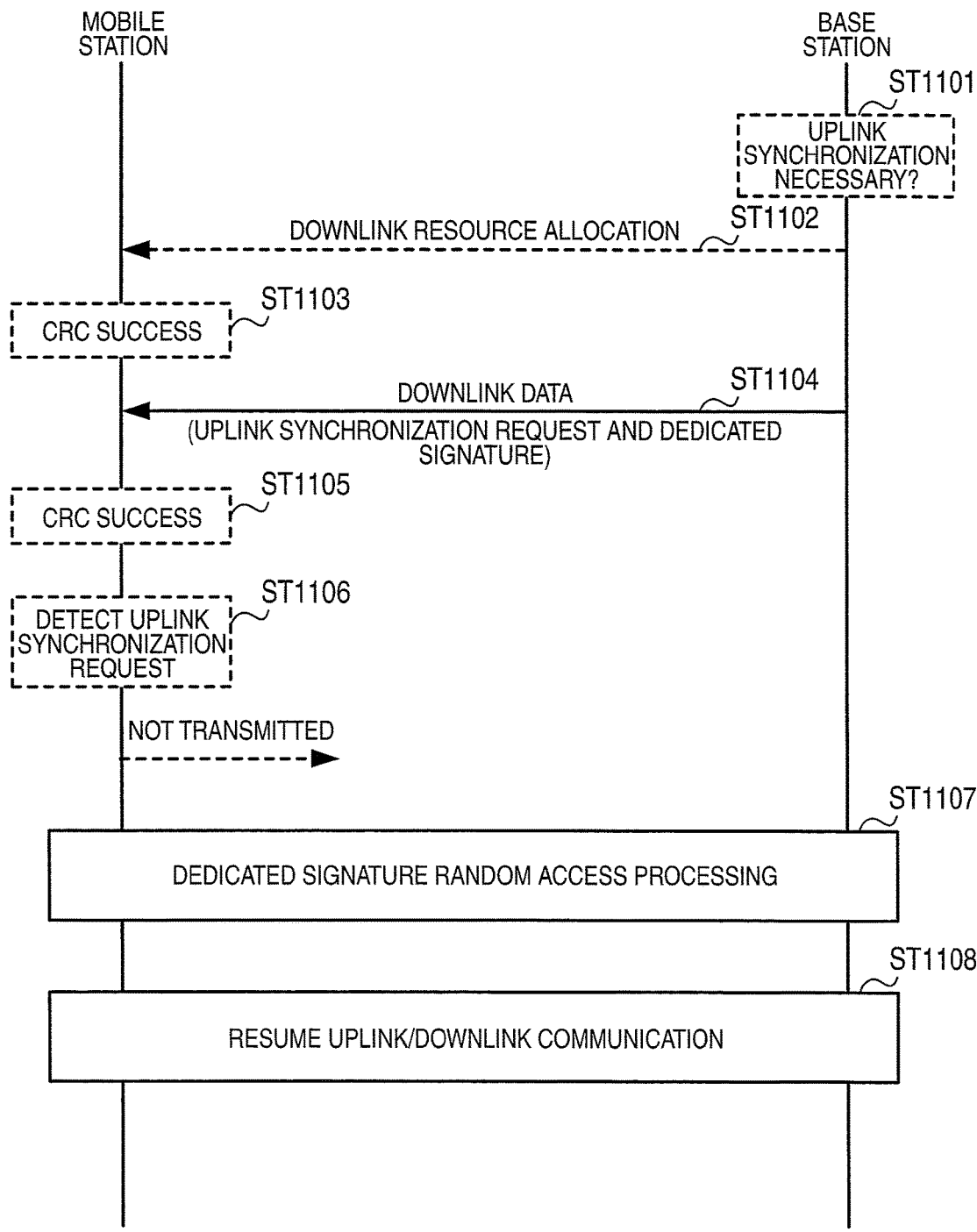

[FIG. 12]
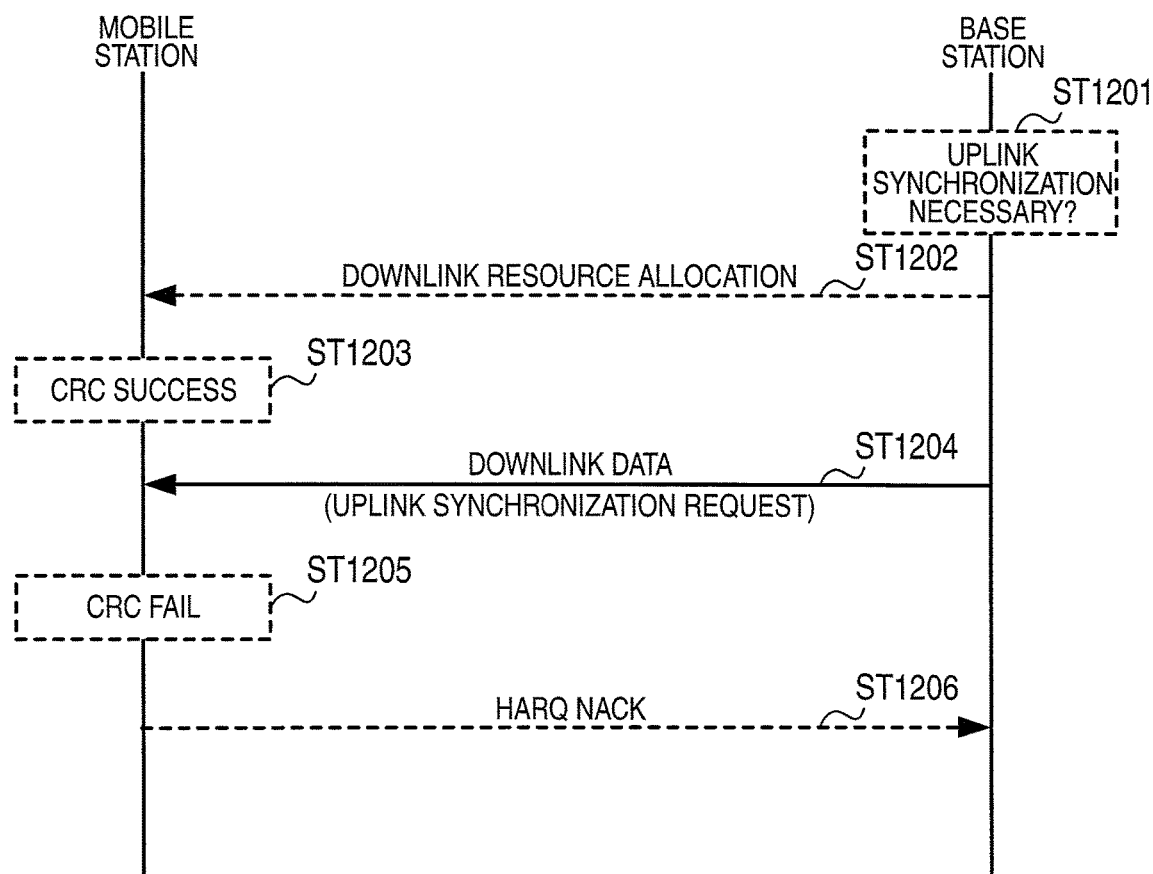

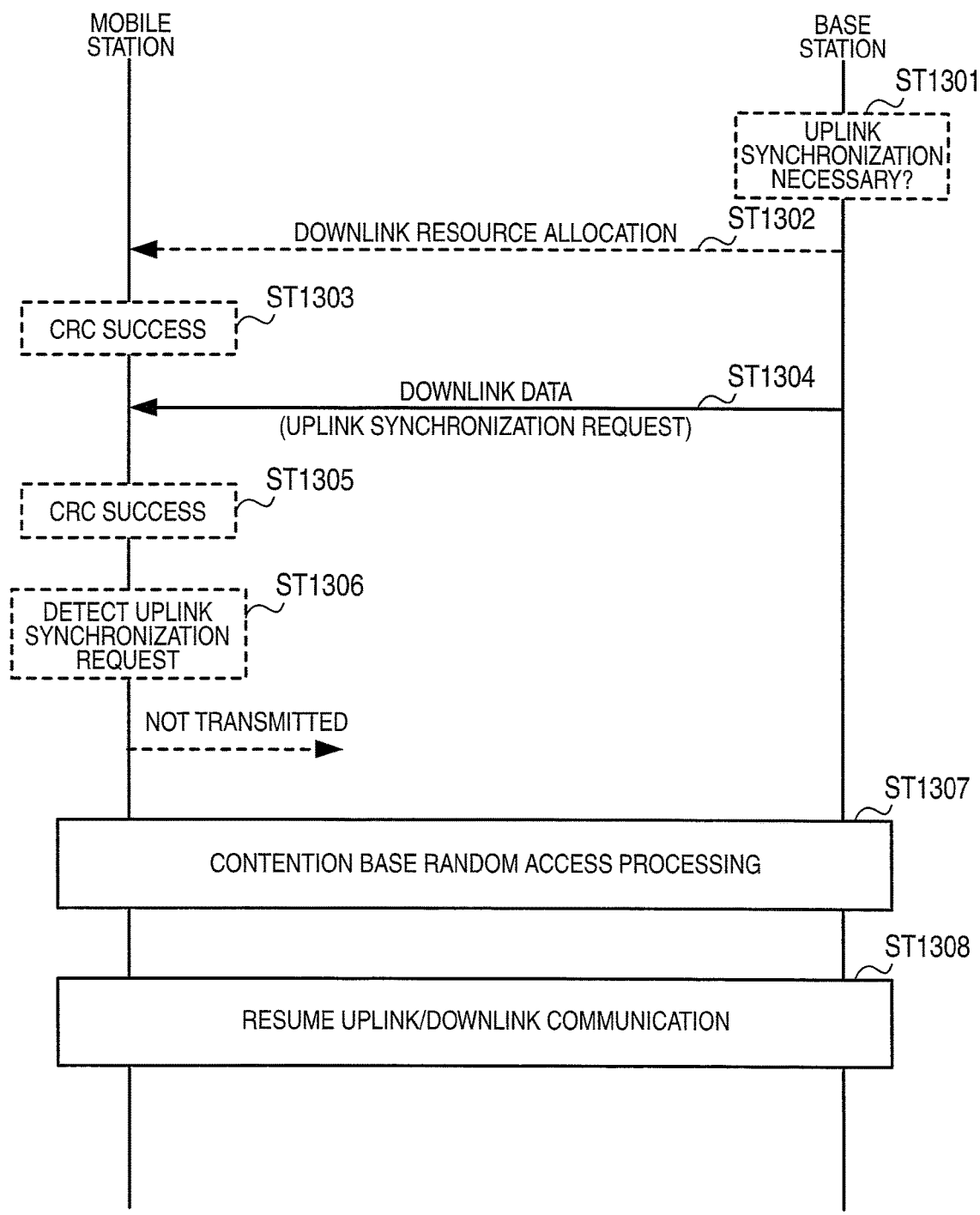

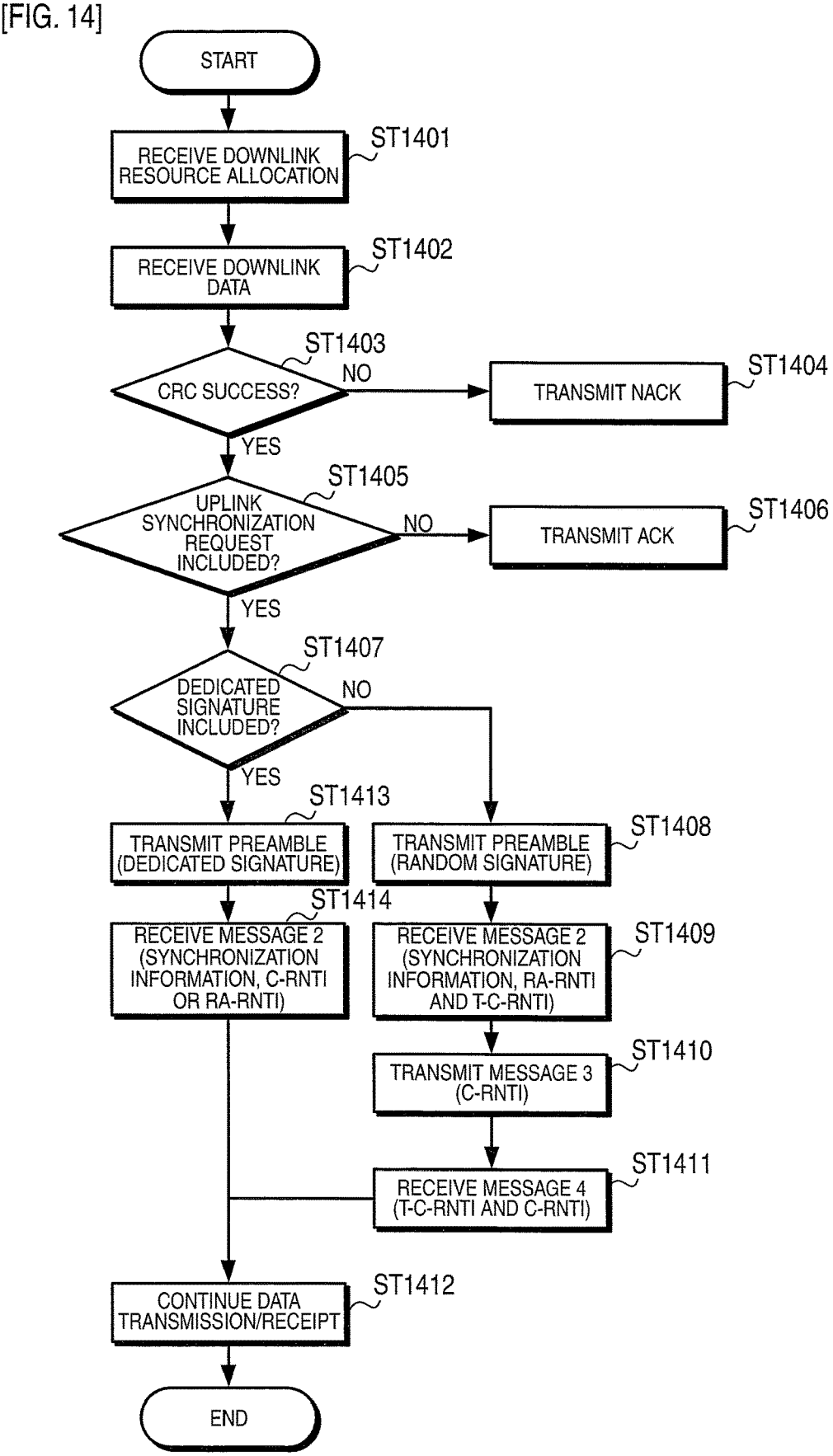
[FIG. 14]

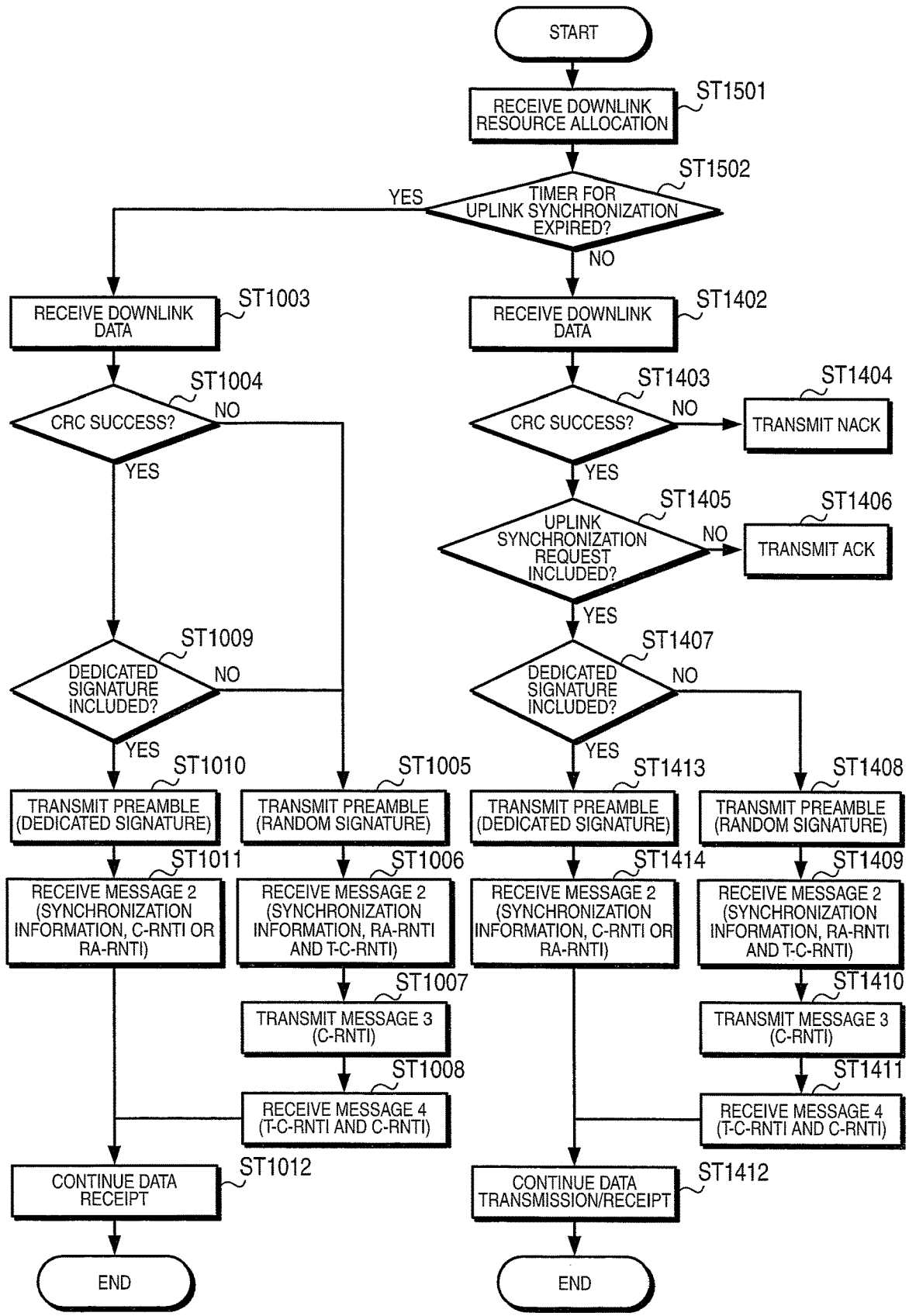
[FIG. 15]

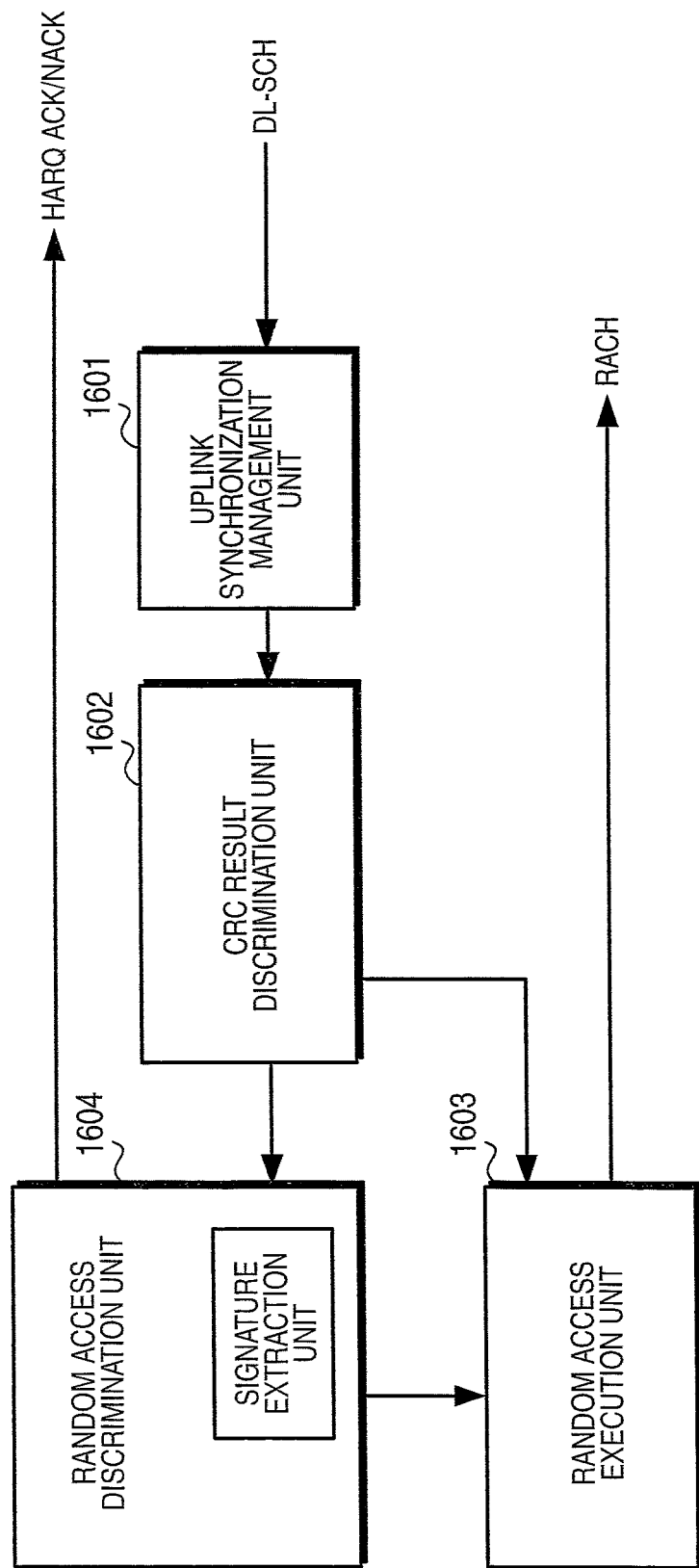
[FIG. 16]

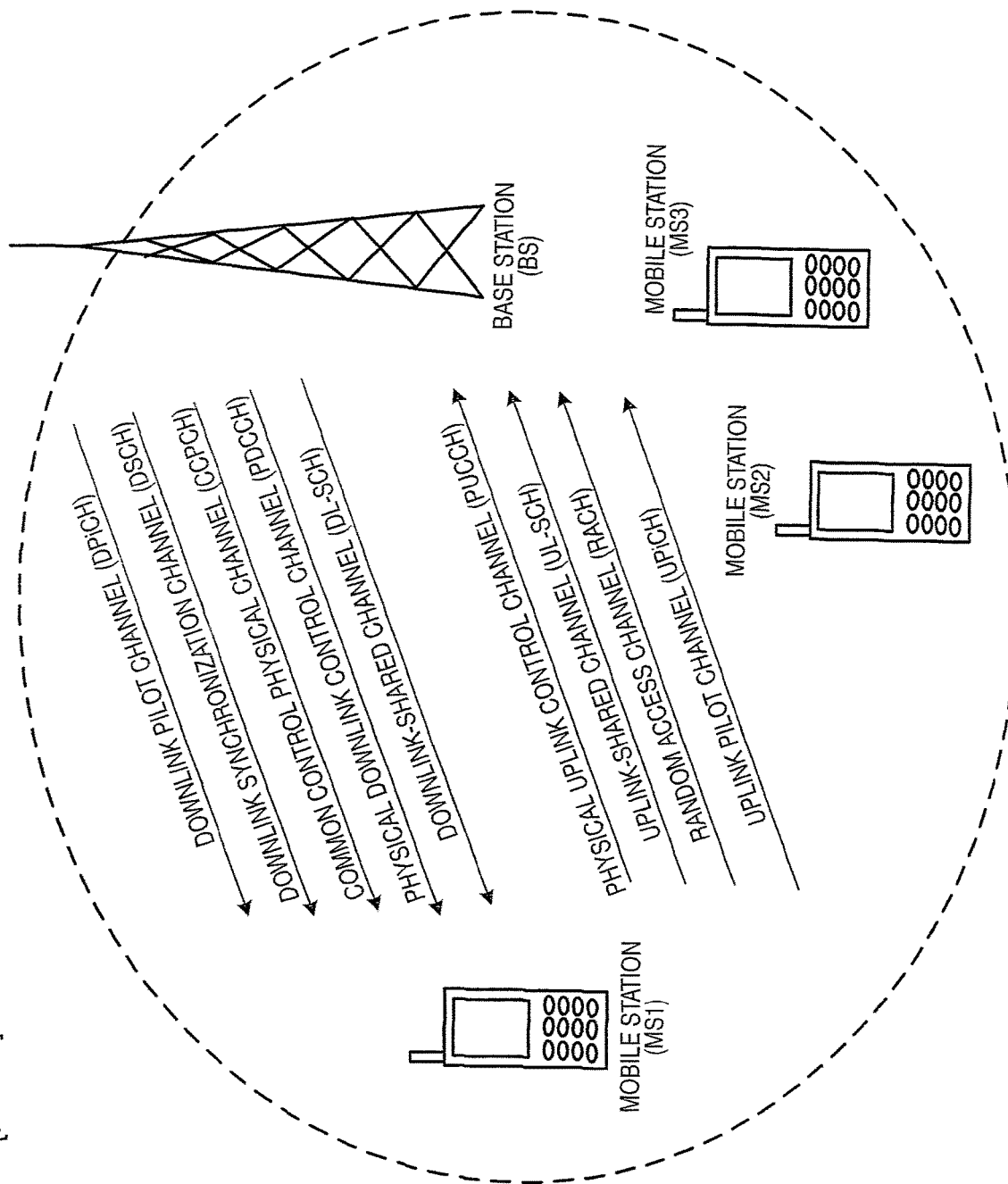
[FIG. 17]

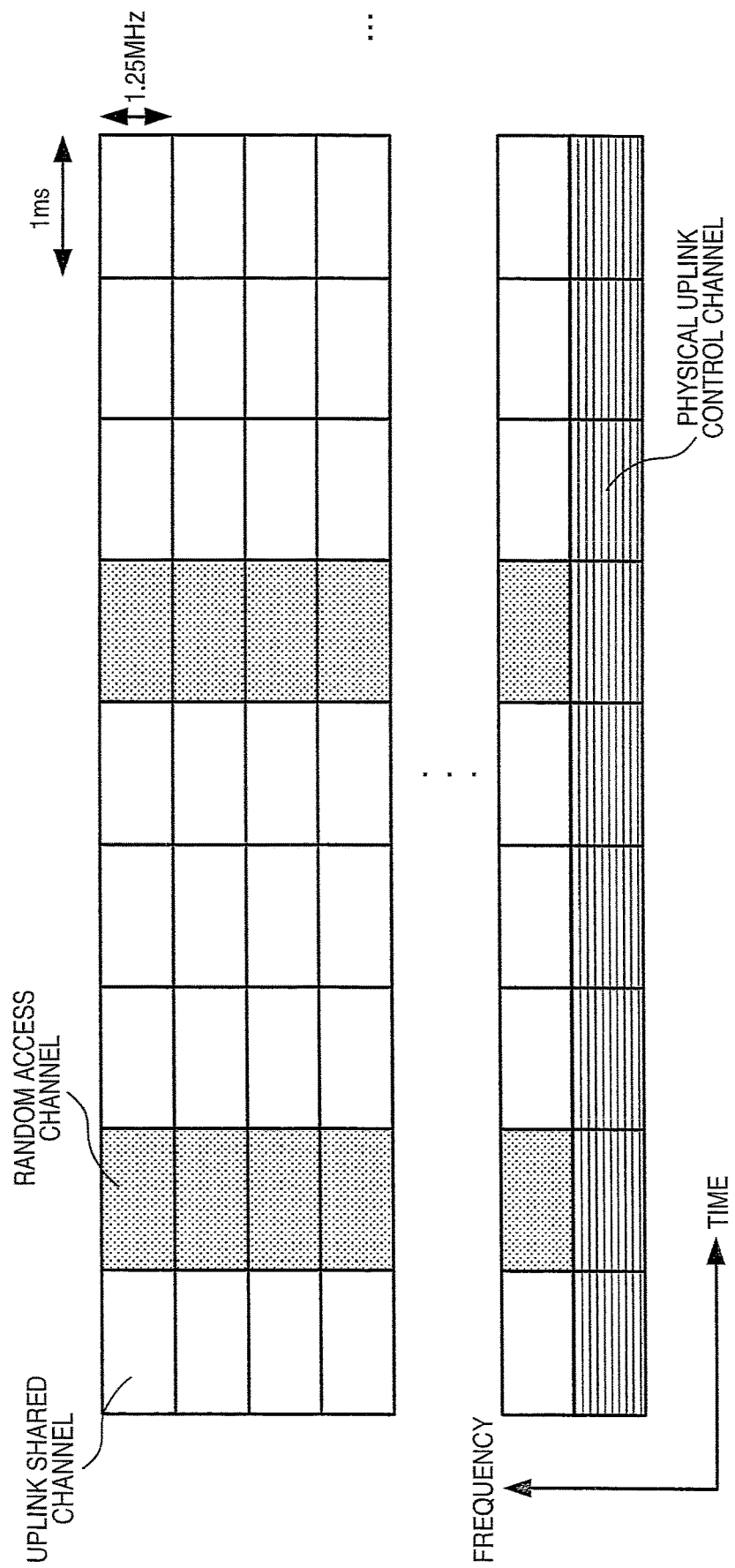

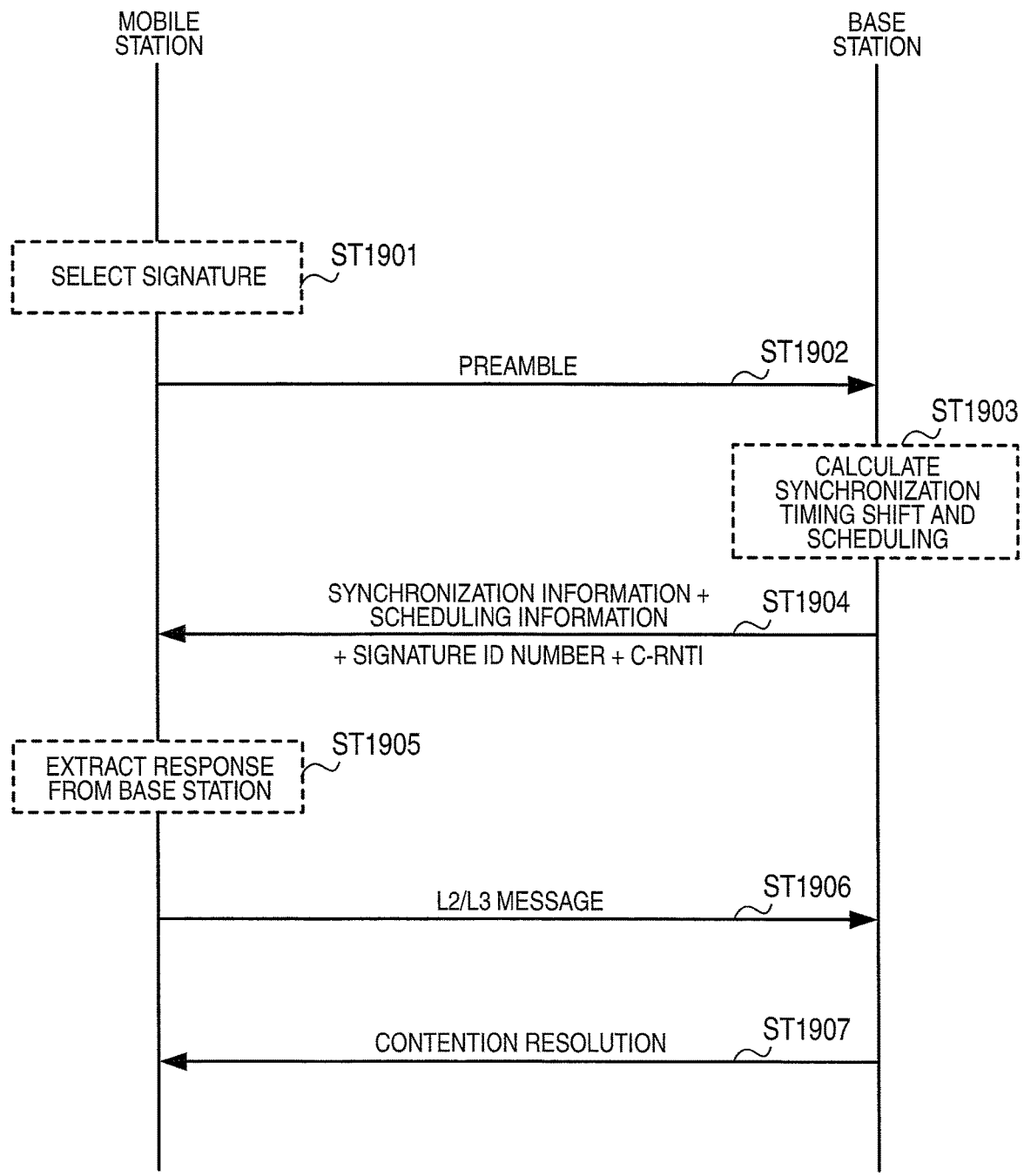
[FIG. 19]

[FIG. 20]
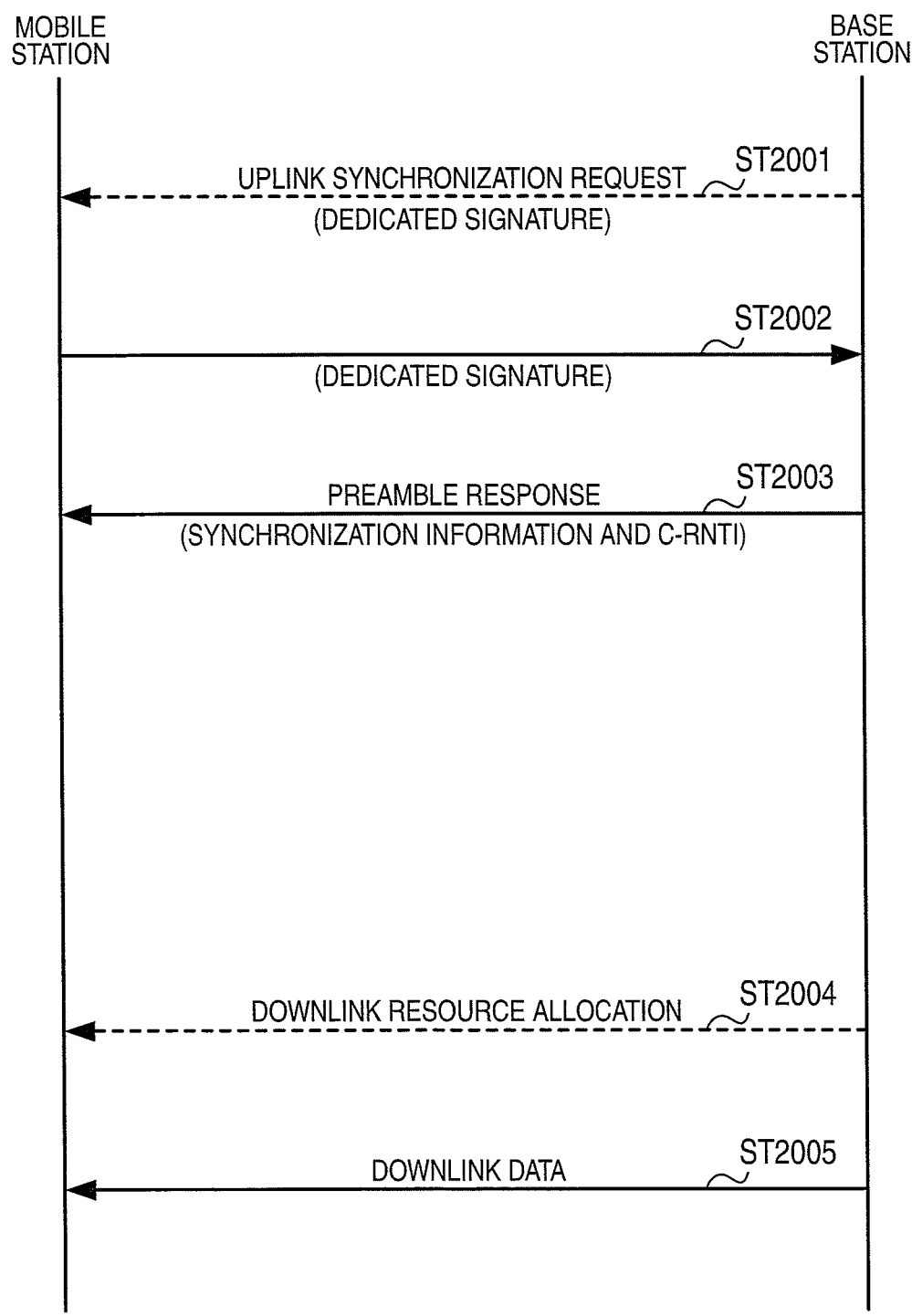

MOBILE STATION APPARATUS AND METHOD TO PERFORM A RANDOM ACCESS USING A RANDOMLY SELECTED SIGNATURE IN A CELLULAR COMMUNICATION SYSTEM

This application is a Continuation of U.S. application Ser. No. 16/168,579, filed on Oct. 23, 2018, which is a Divisional of U.S. application Ser. No. 14/678,498, filed on Apr. 3, 2015, now U.S. Pat. No. 10,123,354, issued on Nov. 6, 2018, which is a Continuation of U.S. application Ser. No. 14/050,116, filed on Oct. 9, 2013, now U.S. Pat. No. 9,042,307, issued on May 26, 2015, which is a Divisional of application Ser. No. 12/593,884 filed on Sep. 29, 2009, now U.S. Pat. No. 8,588,134, issued Nov. 19, 2013, and for which priority is claimed under 35 U.S.C. § 120. Application Ser. No. 12/593,884 is the national phase of PCT International Application No. PCT/JP2008/060184 filed on Jun. 3, 2008, under 35 U.S.C. § 371, which claims the benefit of priority of JP 2008-021557, filed on Jan. 31, 2008, and JP 2007-15099 filed on Jun. 6, 2007. The entire contents of each of the above-identified applications are hereby incorporated by reference.

TECHNICAL FIELD

The present invention relates to a mobile communication system, a base station apparatus and a mobile station apparatus employing the cellular communication system.

BACKGROUND ART

In the 3GPP (3rd Generation Partnership Project), W-CDMA has been standardized as the 3rd generation cellular mobile communication system at present and the service has successively started. Furthermore, HSDPA (High Speed Downlink Packet Access) with a higher communication speed has been standardized and the service is to be started.

On the other hand, in the 3GPP, evolution of the 3rd generation radio access (Evolved Universal Terrestrial Radio Access; hereinafter referred to as the EUTRA) is being examined. As a downlink of the EUTRA, OFDM (Orthogonal Frequency Division Multiplexing) has been proposed. Also, as an uplink of the EUTRA, a single carrier communication system of DFT (Discrete Fourier Transform)-spread OFDM has been proposed.

The uplink of the EUTRA includes, as illustrated in FIG. 17, an Uplink Pilot Channel UPiCH, a Random Access Channel RACH, an Uplink Shared Channel UL-SCH and a Physical Uplink Control Channel PUCCH.

The downlink of the EUTRA includes, as illustrated in FIG. 17, a Downlink Pilot Channel DPiCH, a Downlink Synchronization Channel DSCH, a Common Control Physical Channel CCPCH, a Physical Downlink Control Channel PDCCH (L1/L2 (Layer 1/Layer 2) control channel), a Downlink-Shared Channel DL-SCH) (see, for example, Non-patent Document 1).

In the OFDM communication system, signals transmitted from each of a plurality or mobile stations to a base station are demodulated in a batch, and therefore, it is necessary to control arrival time of signals reaching from respective mobile stations to the base station to be constant. Although interference derived from delay can be prevented in the OFDM communication system by providing a guard interval (of, for example, 5 microseconds with a subcarrier of 15 kHz and an OFDM symbol of 70 microseconds), the interference cannot be avoided if the timing is shifted beyond the guard interval.

A random access channel, using a minimum unit of a 1.25 MHz band, is constituted so as to cope with a large number of accesses by, for example, preparing a plurality of access channels as illustrated in FIG. 18.

FIG. 18 is a diagram illustrating an exemplary assignment on radio resources of a random access channel RACH, an uplink shared channel UL-SCH, an uplink pilot channel UPiCH and a physical uplink control channel PUCCH. In FIG. 18, the abscissa indicates the time and the ordinate indicates the frequency. Also, FIG. 18 illustrates the structure of one radio frame, and the radio frame is divided into a plurality of radio resources. In this exemplary structure, each radio resource is constituted as a unit area of 1.25 MHz in the frequency direction and 1 ms in the time direction, and the random access channel RACH and the uplink shared channel UL-SCH of FIG. 17 are allocated to these areas as illustrated in FIG. 18. In this manner, the random access channel RACH uses the 1.25 MHz band as the minimum unit. Incidentally, in FIG. 18, the uplink pilot channel UPiCH is allocated dispersedly in the areas of the uplink shared channel UL-SCH with respect to each symbol or subcarrier.

The random access channel is used for the principal purpose of attaining synchronization between a mobile station apparatus (hereinafter referred to as the "mobile station") and a base station apparatus (hereinafter referred to as the "base station"). Furthermore, consideration is made for transmitting information of several bits such as a request for scheduling of allocating a radio resource to reduce connect time between the mobile station and the base station (see, for example, Non-Patent Document 2).

In a random access, a preamble alone is transmitted for attaining synchronization. The preamble includes a signature corresponding a signal pattern representing information, and information of several bits can be specified by preparing several tens kinds of signatures. At present, transmission of 6-bit information is assumed and preparation of 64 kinds of signatures is assumed.

It is assumed that a random ID is allocated to 5 bits of 6-bit information and that information such as a reason for the random access and a path loss/CQI (Channel Quality Indicator) of the downlink is allocated to the remaining 1 bit (see, for example, Non-Patent Document 3).

FIG. 19 is a sequence chart used for explaining an exemplary procedure of a conventional random access. In the procedure of the conventional random access, as illustrated in FIG. 19, a mobile station first selects a signature on the basis of a random ID, a reason for the random access and path loss/CQI information at the downlink (step (hereinafter shortened as "ST"). Then, a preamble including the selected signature (that is, a random access preamble) is transmitted by using a random access channel (ST1902: Message 1).

When a base station receives the preamble from the mobile station, it calculates, on the basis of the preamble, synchronization timing shift between the mobile station and the base station and performs scheduling for transmitting an L2/L3 (Layer 2/Layer 3) message (ST1903). Thereafter, when it is found from the reason for the random access that the mobile station needs C-RNTI (Cell-Radio Network Temporary Identity), the base station allocates C-RNTI to the mobile station, and transmits a random access response including synchronization timing shift information (synchronization information), scheduling information, a signature ID number and the C-RNTI (ST1904: Message 2).

When the mobile station receives these information from the base station, it extracts a response from the base station including the transmitted signature ID number (ST1905). Then, the mobile station transmits an L2/L3 message by using a radio resource scheduled by the base station (ST1906: Message 3). When the base station receives the L2/L3 message from the mobile station, it transmits contention resolution for determining whether or not contention has occurred with another mobile station (ST1907: Message 4) (see, for example, Non-Patent Document 3).

A problem of such a random access is occurrence of contention caused when a plurality of different mobile stations select the same signature and the same random access channel. When a plurality of mobile stations select the same signature and perform transmission by using a radio resource block having the same time and frequency, namely, by using the same random access channel, contention occurs in the preamble (ST1902) of FIG. 19.

When the base station cannot detect the preamble (ST1902) due to such contention, it cannot transmit the response (ST1904) including the synchronization information and the like. In this case, since the mobile station cannot receive the response (ST1904) from the base station, it should perform a random access again by selecting a signature and a random access channel after a prescribed time.

On the other hand, if when the base station can detect the preamble (ST1902), the base station performs the scheduling of an L2/L3 message and calculates the synchronization timing shift for transmitting the response (ST1904) to the mobile station. However, the plural mobile stations receive the response (ST1904) from the base station. Therefore, the plural mobile stations transmit the L2/L3 message (ST1906) by using the scheduled radio resource, resulting in causing contention in the L2/L3 message (ST1906).

When the base station cannot detect the L2/L3 message (ST1906) due to such contention, it cannot transmit the response (ST1907). In this case, since the mobile station cannot receive the response (ST1907) from the base station, it should perform a random access again by selecting a signature and a random access channel after a prescribed time. In this manner, in the case where a plurality of mobile stations select the same signature and random access channel, contention may occur, and when the contention occurs, it takes time elapsing up to ST1907 of FIG. 19 at most to detect the contention.

On the other hand, in transmission of a downlink-shared channel DL-SCH, HARQ (Hybrid Automatic Repeat Request) is employed. In the HARQ, after decoding the DL-SCH in a mobile station, ACK (Acknowledgement) is fed back to the base station when CRC (Cyclic Redundancy Check) succeeds and HACK (Negative Acknowledgement) is fed back to the base station when the CRC fails, and thus, the base station determines whether or not retransmission is to be performed. This ACK/HACK is transmitted by using a physical ink control channel PUCCH immediately after receiving the DL-SCH. The mobile station receives the downlink-shared channel DL-SCH after receiving the physical downlink control channel PDCCH, and transmits the ACK when the CRC succeeds.

Incidentally, in the case where the mobile station and the base station are out of uplink synchronization with each other (for example, in the case of a DRX state where data transmission has not been performed for a long period of time and the mobile station has been monitoring, a signal for allocating a downlink resource on a long cycle), when downlink data transmission from the base station is resumed, the mobile station cannot transmit the HARQ ACK/HACK (Hybrid Automatic Repeat Request Acknowledgement/Negative Acknowledgement) by using a PUCCH. This is because since it is out of uplink synchronization, if the HARQ ACK/NACK is transmitted, it causes interference with another mobile station. According in resuming the downlink data transmission, it is necessary to attain uplink synchronization through a random access.

In this case, contention cannot be avoided because a random access is performed, and it is apprehended that it may take a long time to resume the downlink data transmission. In order to avoid such a problem, a proposal for preventing contention in a random access performed for resuming downlink data transmission by using a signature for resuming the downlink data transmission has been made (see, for example, Non-Patent Document 4). At this point, the procedure for resuming downlink data transmission proposed in Non-Patent Document 4 will be described with reference to FIG. 20.

When it is determined to resume downlink data transmission to a mobile station out of uplink synchronization, a base station transmits an uplink synchronization request to the mobile station as illustrated in FIG. 20 (ST2001). The uplink synchronization request is transmitted by using an L1/L2 (layer 1/Layer 2) physical downlink control channel PDCCH. The uplink synchronization request includes a signature ID number of a random access to be sent from the mobile station. In the following description, this is designated as a dedicated signature.

When the uplink synchronization request is received from the base station, the mobile station transmits a preamble (a random access preamble) including the dedicated signature received in the uplink synchronization request by using a random access channel to the base station (ST2002). When the preamble including the dedicated signature is received from the mobile station, the base station transmits a TA (Timing Advance) command corresponding to a synchronization timing shift to the mobile station as a response (a preamble response) to the random access (ST2003).

After transmitting the TA command, the base station transmits an L1/L2 control channel including downlink resource a location to the mobile station (ST2004). Subsequently, the base station transmits downlink data to the mobile station (ST2005).

Non-Patent Document 1: R1-050850 "Physical Channel and Multiplexing in Evolved UTRA Uplink", 3GPP TSG RAN WG1 Meeting #42 London, UK, Aug. 29-Sep. 2, 2005

Non-Patent Document 2: 3GPP TR (Technical Report) 25.814, V7.0.0 (2006-06), Physical layer aspects for evolved Universal Terrestrial Radio Access (UTRA)

Non-Patent Document 3: 3GPP TS (Technical Specification) 36.300, VO. 90 (2007-03), Evolved Universal Terrestrial Radio Access (E-UTRA) and Evolved Universal Terrestrial Radio Access Network (E-UTRAN), Overall description Stage 2

Non-Patent Document 4: R2-062165 "UL Synchronization", 3GPP TSG RAN WG2 Meeting #54 Tallinn, 28 Aug.-1 Sep. 2006

DISCLOSURE OF THE INVENTION

Problem to be Solved the Invention

In resuming the downlink data transmission, however, although transmission of a dedicated signature included in an L1/L2 control channel is being examined, if there are not sufficient allocatable dedicated signatures, an uplink synchronization request cannot be transmitted. As a result, when a dedicated signature cannot be allocated, there arises a problem that the L1/L2 control channel is uselessly used. Such a problem arises similarly not only when, for example, continuation of uplink synchronization is managed with a timer in both a base station and a mobile station but also when a base station detects that a mobile station is out of uplink synchronization.

The present invention was devised in consideration of such a problem, and an object of the invention is providing a mobile communication system, a base station apparatus and a mobile station apparatus in which an efficient procedure can be realized when a mob e station is out of uplink synchronization, no matter whether a dedicated signature can be allocated.

Means for Solving the Problem (1) In order to achieve the object, the present invention provides the following means: The mobile station apparatus of this invention manages uplink synchronization and performs a random access in detecting an uplink or downlink resource allocation when out of uplink synchronization.

The uplink synchronization is thus managed, and when the mobile station apparatus is out of uplink synchronization and uplink or downlink resource allocation is detected, a random access performed, and therefore, base station apparatus can efficiently instruct the mobile station apparatus to perform a random access through a simple operation.

(2) Alternatively, the mobile station apparatus of this invention performs a random access by using a dedicated signature in detecting the dedicated signature and performs a random access by using a randomly selected signature in detecting a signature not reserved as a dedicated signature.

In this manner, a random access is performed by using a dedicated signature in detecting the dedicated signature and a random access is performed by using a randomly selected signature in detecting a signature not reserved as a dedicated signature, and therefore, a base station apparatus can efficiently instruct the mobile station apparatus to perform a random access through a simple operation.

(3) Alternatively, the mobile communication system of this invention includes a base station apparatus and a mobile station apparatus, the base station apparatus allocates an uplink or downlink resource allocation to the mobile station apparatus, and the mobile station apparatus manages uplink synchronization and performs a random access in detecting or downlink resource allocation when out of uplink synchronization.

In this manner, the base station apparatus allocates an uplink or downlink resource allocation to the mobile station apparatus and the mobile station apparatus manages uplink synchronization, and when the mobile station apparatus is out of uplink synchronization and uplink or downlink resource allocation is detected, a random access is performed. Therefore, the base station apparatus can efficiently instruct the mobile station apparatus to perform a random access through a simple operation.

(4) Alternatively, the mobile communication system of this invention includes a base station apparatus and a mobile station apparatus, the base station apparatus specifies a signature for the mobile station apparatus, and the mobile station apparatus performs a random access by using a dedicated signature in detecting the dedicated signature and performs a random access by using a randomly selected signature in detecting a signature not reserved as a dedicated signature.

In this manner, the base station apparatus specifies a signature for the mobile station apparatus, and the mobile station apparatus performs a random access by using a dedicated signature when the dedicated signature is detected, and performs a random access by using a randomly selected signature when a signature not reserved as a dedicated signature is detected. Therefore, the base station apparatus can efficiently instruct the mobile station apparatus to perform a random access through a simple operation.

(5) Alternatively, the mobile communication system of this invention includes a base station apparatus transmitting a DL-SCH to a mobile station apparatus, the mobile station apparatus performs a random access by using a different signature depending upon information included in the DL-SCH and a result of CRC of the DL-SCH, and the base station apparatus transmits downlink data after determining whether or not contention resolution is to be transmitted depending upon the signature used in the random access.

In this manner, the mobile station apparatus performs a random access by using a different signature depending upon information included in the DL-SCH and a result of CRC of the DL-SCH, and the base station apparatus transmits downlink data after determining whether or not contention resolution is to be transmitted depending upon the signature used in the random access. Therefore, since downlink data transmission can be resumed in accordance with the signature selected by the mobile station apparatus while assuming occurrence of contention with another mobile station apparatus, an efficient procedure can be realized in resuming downlink data transmission, for example, no matter whether a dedicated signature can be allocated. Also in uplink resynchronization, an efficient procedure can be realized, for example, no matter whether a dedicated signature for uplink resynchronization can be allocated.

(6) In the mobile communication system of this invention, the mobile station apparatus receives the DL-SCH including information for specifying a dedicated signature used for resuming downlink data transmission, and performs a random access by using the dedicated signature when the CRC of the DL-SCH succeeds, and the base station apparatus transmits the downlink data without transmitting the contention resolution.

In this manner, when the mobile station apparatus performs a random access by using a dedicated signature, downlink data is transmitted without transmitting contention resolution, and therefore, an efficient procedure can be realized when a dedicated signature can be allocated in resuming downlink data transmission.

(7) In the mobile communication system of this invention, the mobile station apparatus receives the DL-SCH including information for specifying a dedicated signature used for resuming downlink data transmission, and performs a random access by using a randomly selected signature when the CRC of the DL-SCH fails, and the base station apparatus transmits the downlink data after transmitting the contention resolution.

In this manner, when the mobile station apparatus performs a random access by using a randomly selected signature, downlink data is transmitted after transmitting contention resolution. Therefore, even when a dedicated signature cannot be allocated in resuming downlink data transmission, an efficient procedure can be realized in consideration of contention with another mobile station apparatus.

(8) In the mobile communication system of this invention, the mobile station apparatus manages uplink synchronization, and performs a random access by using a randomly selected signature in receiving the DL-SCH not including information for specifying a dedicated signature used for resuming downlink data transmission when out of unlink synchronization, and the base station apparatus transmits the downlink data after transmitting the contention resolution.

In this manner, when the mobile station apparatus performs a random access by using a randomly selected signature, downlink data is transmitted after transmitting contention resolution. Therefore, even when a dedicated signature cannot be allocated in resuming downlink data transmission, an efficient procedure can be realized in consideration of contention with another mobile station apparatus.

(9) In the mobile communication system of this invention, the base station apparatus instructs to perform a random access by using a randomly selected signature by not transmitting the DL-SCH.

In this manner, a random access using a randomly selected signature is instructed to be performed by not transmitting a DL-SCH, and therefore, a random access using a randomly selected signature can be instructed to be performed without using a downlink resource.

(10) In the mobile communication system of this invention, the mobile station apparatus receives the DL-SCH including an uplink synchronization request and information for specifying a dedicated signature for uplink resynchronization, and performs a random access by using the dedicated signature for the uplink resynchronization when the CRC of the DL-SCH succeeds, and the base station apparatus transmits the downlink data without transmitting the contention resolution.

In this manner, when the mobile station apparatus performs a random access by using a dedicated signature for uplink resynchronization, downlink data is transmitted without transmitting contention resolution, and therefore, an efficient procedure can be realized when a dedicated signature for uplink resynchronization can be allocated for uplink resynchronization. In particular, when the mobile station apparatus receives a DL-SCH including an uplink synchronization request from the base station apparatus, the mobile station apparatus performs a random access by using the dedicated signature for uplink resynchronization. Therefore, even when the mobile station apparatus does not recognize that it is out of uplink synchronization, the uplink resynchronization can be attained.

(11) In the mobile communication system of this invention, the mobile station apparatus performs a random access by using a randomly selected signature in receiving the DL-SCH including an uplink synchronization request but not including information for specifying a dedicated signature for uplink resynchronization, and the base station apparatus transmits the downlink data after transmitting the contention resolution.

In this manner, when the mobile station apparatus performs a random access by using a randomly selected signature, downlink data is transmitted after transmitting contention resolution. Therefore, even when a dedicated signature for uplink resynchronization cannot be allocated for uplink resynchronization, an efficient procedure can be realized in consideration of contention with another mobile station apparatus. In particular, when the mobile station apparatus receives a DL-SCH including an uplink synchronization request from the base station apparatus, the mobile station apparatus performs a random access by using a randomly selected signature, and therefore, even when the mobile station apparatus does not recognize that it is out of uplink synchronization, the uplink resynchronization can be attained.

(12) The base station apparatus of this invention that transmits a DL-SCH to a mobile station out of uplink synchronization, includes transmitting means for transmitting a DL-SCH including information of a dedicated signature for resuming downlink data transmission; and controlling means for determining whether or not contention resolution is to be transmitted depending upon a signature used in a random access performed by the mobile station apparatus.

In this manner, since it is determined whether or not contention resolution is to be transmitted depending upon the signature used in the random access performed by the mobile station apparatus, downlink data transmission can be resumed, while assuming occurrence of contention, in accordance with the signature selected by the mobile station apparatus. Therefore, an efficient procedure can be realized in resuming downlink data transmission no matter whether, for example, a dedicated signature for resuming downlink data transmission can be allocated.

(13) In the base station apparatus of this invention, the transmitting means transmits a DL-SCH including information for specifying the dedicated signature, and the controlling means does not transmit the contention resolution in detecting a random access performed by using the dedicated signature.

In this manner, when a random access performed by using a dedicated signature is accepted from a mobile station apparatus, contention resolution is not transmitted, and therefore, an efficient procedure can be realized when a dedicated signature can be allocated in resuming downlink data transmission.

(14) In the base station apparatus of this invention, the transmitting means transmits a DL-SCH including information for specifying the dedicated signature, and the controlling means transmits the contention resolution in detecting a random access performed by using a randomly selected signature.

In this manner, when a random access performed by using a randomly selected signature is accepted from a mobile station apparatus, contention resolution is transmitted. Therefore, even when a dedicated signature cannot be allocated in resuming downlink data transmission, an efficient procedure can be realized in consideration of contention with another mobile station apparatus.

(15) In the base station apparatus of this invention, the transmitting means transmits a DL-SCH not including information for specifying the dedicated signature, and the controlling means transmits the contention resolution in detecting a random access performed by using a randomly selected signature.

In this manner, when a random access performed by using a randomly selected signature is accepted from a mobile station apparatus, contention resolution is transmitted. Therefore, even when a dedicated signature cannot be allocated in resuming downlink data transmission, an efficient procedure can be realized in consideration of contention with another mobile station apparatus.

(16) In the base station apparatus of this invention, the transmitting means instructs to perform a random access by using a randomly selected signature by not transmitting the DL-SCH.

In this manner since a random access using a randomly selected signature is instructed to be performed by not transmitting a DL-SCH, a random access using a randomly selected signature can be instructed to be performed without using a downlink resource.

(17) The base station apparatus of this invention that transmits a DL-SCH to a mobile station apparatus out of uplink synchronization, includes transmitting means for transmitting a DL-SCH including an uplink synchronization request and formation of a dedicated signature for uplink resynchronization.

In this manner, since a DL-SCH including synchronization request and information of a dedicated signature for uplink resynchronization is transmitted to a mobile station apparatus of uplink synchronization, the uplink synchronization request and the information of the dedicated signature for uplink resynchronization can be transmitted during the communication.

(18) The mobile station apparatus of this invention that receives a DL-SCH from a base station apparatus, includes discriminating means for discriminating information included in the DL-SCH and a CRC result of the DL-SCH; and random access executing means for performing a random access by using a different signature depending upon a discrimination result obtained by the discriminating means.

In this manner, since a random access is performed by using a different signature depending upon information included in the DL-SCH and a discrimination result of the CRC of the DL-SCH, the base station apparatus can resume downlink data transmission while assuming contention, for example, depending upon the signature used in the random access, and therefore, an efficient procedure can be realized in resuming downlink data transmission no matter whether a dedicated signature for resuming downlink data transmission can be allocated. Furthermore, since the base station apparatus can attain uplink resynchronization while assuming occurrence of contention depending upon a signature used in the random access, an efficient procedure can be realized in the uplink resynchronization no matter whether a dedicated signature for uplink resynchronization can be allocated.

(19) In the mobile station apparatus of this invention, the mobile station apparatus manages uplink synchronization, and when the mobile station apparatus is out of uplink synchronization and the discriminating means discriminates that the DL-SCH includes information for specifying a dedicated signature for resuming downlink data transmission and that the CRC result of the DL-SCH is successful, the random access executing means performs a random access by using the dedicated signature.

In this manner, when it is discriminated that the DL-SCH includes information for specifying a dedicated signature for resuming downlink data transmission and that the CRC result of the DL-SCH is successful, a random access is performed by using the dedicated signature. Therefore, when a dedicated signature can be allocated in resuming downlink data transmission, an efficient procedure can be realized by, for example, transmitting, from a base station apparatus, downlink data without transmitting contention resolution in accordance with the random access performed by using the dedicated signature.

(20) In the mobile station apparatus of this invention, the mobile station apparatus manages uplink synchronization and when the mobile station apparatus is out of uplink synchronization and the discriminating means discriminates that the CRC result of the DL-SCH is unsuccessful, the random access executing means performs a random access by using a randomly selected signature.

In this manner, a random access is performed by using a randomly selected signature when the CRC result of the DL-SCH is discriminated to be unsuccessful, and therefore, even when a dedicated signature cannot be allocated in resuming downlink data transmission, an efficient procedure can be realized in consideration of contention with another mobile station apparatus by, for example, transmitting, from a base station apparatus, downlink data after transmitting contention resolution in accordance with the random access performed by using the randomly selected signature.

(21) In the mobile station apparatus of this invention, the mobile station apparatus manages uplink synchronization, and when the mobile station apparatus is out of uplink synchronization and the discriminating means discriminates that the DL-SCH does not include information for specifying a dedicated signature for resuming downlink data transmission, the random access executing means performs a random access by using a randomly selected signature.

In this manner, a random access is performed by using a randomly selected signature when the DL-SCH is discriminated not to include information for specifying a dedicated signature, and therefore, even when a dedicated signature cannot be allocated in resuming downlink data transmission, an efficient procedure can be realized in consideration of contention with another mobile station apparatus by, for example, transmitting, from a base station apparatus, downlink data after transmitting contention resolution in accordance with the random access performed by using the randomly selected signature.

(22) In the mobile station apparatus of this invention, when the discriminating means discriminates that the CRC result of the DL-SCH is successful and that the DL-SCH includes an uplink synchronization request and information for specifying a dedicated signature for uplink resynchronization, the random access executing means performs a random access by using the dedicated signature for uplink resynchronization.

In this manner, when it is discriminated that the DL-SCH includes an unlink synchronization request and information for specifying a dedicated signature for uplink resynchronization and that the CRC result of the DL-SCH is successful, a random access is performed by using the dedicated signature for the uplink resynchronization. Therefore, an efficient procedure can be realized when a dedicated signature for uplink resynchronization can be allocated for the uplink resynchronization by, for example, transmitting, from a base station apparatus, downlink data without transmitting contention resolution in accordance with the random access performed by using the dedicated signature. In particular, a random access is performed when it is discriminated that the DL-SCH includes an uplink synchronization request, and therefore, even when the mobile station apparatus does not recognize that it is out of uplink synchronization, the uplink resynchronization can be attained.

(23) In the mobile station apparatus of this invention, when the discriminating means discriminates that the DL-SCH includes an uplink synchronization request but does not include information for specifying a dedicated signature for uplink resynchronization, the random access executing means performs a random access by using a randomly selected signature.

In this manner, when it is discriminated that the DL-SCH includes an uplink synchronization request but does not include information for specifying a dedicated signature for uplink resynchronization, a random access is performed by using a randomly selected signature. Therefore, even when a dedicated signature for uplink resynchronization cannot be allocated for uplink resynchronization, an efficient procedure can be realized in consideration of contention with another mobile station apparatus by, for example, transmitting, from a base station apparatus, downlink data after transmitting contention resolution in accordance with the random access performed, by using the randomly selected signature. In particular, a random access is performed when it is discriminated that the DL-SCH includes an uplink synchronization request, and therefore, even when the mobile station apparatus does not recognize that it is out of uplink synchronization, the uplink resynchronization can be attained.

Effects of the Invention

According to the present invention, it is possible to resume downlink data transmission and attain uplink resynchronization in accordance with a signature selected by a mobile station apparatus while assuming occurrence of contention with another mobile station apparatus, and therefore, an effective procedure can be realized when a mobile station is out of uplink synchronization, no matter whether a dedicated signature can be allocated.

BRIEF DESCRIPTION OF THE DRAWINGS

FIG. 1 is a block diagram illustrating an exemplary configuration of a base station included in a communication system according to an embodiment of the invention.

FIG. 2 is a block diagram illustrating an exemplary configuration of a mobile station included in the communication system of the embodiment.

FIG. 3 is a sequence chart illustrating an operation performed when the base station of the embodiment transmits a dedicated signature by using a DL-SCH and the mobile station succeeds in CRC of the DL-SCH.

FIG. 4 is a sequence chart illustrating an operation performed when the base station of the embodiment transmits a dedicated signature by using a DL-SCH and the mobile station fails in the CRC of the DL-SCH.

FIG. 5 is a sequence chart illustrating an operation performed when the base station of the embodiment does not transmit a dedicated signature by using a DL-SCH.

FIG. 6 is a sequence chart illustrating an operation performed when the base station of the embodiment does not transmit a DL-SCH.

FIG. 7 is a sequence chart illustrating an operation performed when the mobile station of the embodiment fails in the CRC of an L1/L2 control channel.

FIG. 8 is a flowchart used for explaining an operation performed by the base station of the embodiment for resuming downlink data transmission to a mobile station out of uplink synchronization.

FIG. 9 is a flowchart used for explaining an operation performed by the base station of the embodiment for random access control.

FIG. 10 is a flowchart used for explaining an operation performed by the mobile station out of uplink synchronization of the embodiment for resuming downlink data transmission.

FIG. 11 is a sequence chart illustrating an operation performed when the base station of the embodiment transmits an uplink synchronization request and a dedicated signature by using a DL-SCH and the mobile station succeeds in the CRC of the DL-SCH.

FIG. 12 is a sequence chart illustrating an operation performed when the base station of the embodiment transmits an uplink synchronization request by using a DL-SCH and the mobile station fails in the CRC of the DL-SCH.

FIG. 13 is a sequence chart illustrating an operation performed when the base station of the embodiment transmits an uplink synchronization request by using a DL-SCH.

FIG. 14 is a flowchart used for explaining an operation performed by the mobile station of this embodiment for uplink resynchronization.

FIG. 15 is a flowchart used for explaining operations performed by the mobile station of the embodiment when continuation of uplink synchronization is managed with a timer and when an uplink synchronization request from the base station is received.

FIG. 16 is a block diagram illustrating an exemplary configuration of a part of an upper layer of the mobile station of the embodiment.

FIG. 17 is a diagram explaining the structure of uplink/downlink of the EUTRA.

FIG. 18 is a diagram explaining a random access channel of the uplink of the EUTRA.

FIG. 19 is a sequence chart used for explaining an exemplary procedure of a conventional random access.

FIG. 20 is a sequence chart used for explaining an exemplary conventional procedure for resuming downlink data transmission.

DESCRIPTION OF REFERENCE NUMERALS

100 base station apparatus (base station)
101 data control unit
102 OFDM modulation unit
103 scheduling unit
104 radio unit
105 channel estimation unit
106 DFT-S-OFDM demodulation unit
107 control data extraction unit
108 preamble detection unit
109 signature management unit
200 mobile station apparatus (mobile station)
201 data control unit
202 DFT-S-OFDM modulation unit
203 scheduling unit
204 signature selection unit
205 preamble generation unit
206 synchronization correction unit
207 radio unit
208 channel estimation unit
209 OFDM demodulation unit
210 control data extraction unit
1601 uplink synchronization management unit
1602 CRC result discrimination unit
1603 random access execution unit
1604 random access discrimination unit

BEST MODE FOR CARRYING OUT THE INVENTION

A preferred embodiment of the invention will now be described with reference to the accompanying drawings. At this point, a random access channel RACH and the content of a preamble corresponding to the prerequisite of the description of a mobile communication system (hereinafter sometimes referred to as the "communication system") according to an embodiment of the invention will be briefly described. A random access channel RACH is a channel having a guard time (of, for example, 97 microseconds) and usable by a mobile station apparatus (hereinafter sometimes referred to as a "mobile station") out of synchronization. A preamble (with a preamble length of, for example, 0.8 ms) is selectable from 64 signatures, and a mobile station selects one of the 64 signatures and transmits it to a base station apparatus (hereinafter sometimes referred to as a "base station"). When a base station receives a random access preamble from a mobile station, it detects a shift between arrival time of the preamble and a base time. The granularity of timing shift information is, for example, 0.52 microsecond.

In the communication system of this embodiment, when downlink data transmission to a mobile station out of uplink synchronization is resumed, a base station transmits downlink resource allocation by using an L1/L2 physical downlink control channel PDCCH and transmits downlink data and a signature to be used for resuming transmission of downlink data (hereinafter referred to as the "dedicated signature") by using downlink-shared channel (hereinafter referred to as the "DL-SCH"). When CRC (Cyclic Redundancy Check) of the DL-SCH does not succeed, the mobile station transmits an RACH indicating that there is contention with another mobile station. On the other hand, when the CRC of the DL-SCH succeeds, the mobile station transmits an RACH indicating that there is no contention with another mobile station by using the dedicated signature included in an L2/L3 message included in the DL-SCH.

The configurations of a base station and a mobile station included in the communication system of this embodiment will now be described. FIG. 1 is a block diagram illustrating an exemplary configuration of the base station included in the communication system of this embodiment. FIG. 2 is a block diagram illustrating an exemplary configuration of the mobile station included in the communication system of this embodiment.

As illustrated in FIG. 1, the base station 100 includes a data control unit 101, an OFDM modulation unit 102, a scheduling unit 103, a radio unit 104, a channel estimation unit 105, a DFT-Spread-OFDM demodulation unit (DFT-S-OFDM demodulation unit) 106, a control data extraction unit 107, a preamble detection unit 108 and a signature management unit 109.

The data control unit 101 accepts input of control data and user data, maps the control data, in accordance with an instruction issued by the scheduling unit 103, in a downlink common control physical channel, a downlink synchronization channel, a downlink pilot channel and a physical downlink control channel, and maps transmission data (user data) for each mobile station in a shared data channel.

The OFDM modulation unit 102 performs OFDM signal processing such as data modulation, serial/parallel conversion of an input signal, IFFT (Inverse Fast Fourier Transform), CP (Cyclic Prefix) insertion and filtering, so as to generate an OFDM signal.

The scheduling unit 103 includes a DL scheduling unit 103a that performs scheduling of downlink and a UL scheduling unit 103b that performs scheduling of uplink. The DL scheduling unit 103a performs scheduling for mapping the user data in respective channels of the downlink based on CQI information supplied by a mobile station and data information of each user supplied from an upper layer. The UL scheduling unit 103b performs scheduling for mapping the user data in respective channels of the uplink based on an estimation result of radio propagation path of the uplink supplied by the channel estimation unit 105 and a resource allocation request issued by the mobile station.

The radio unit 104 upconverts OFDM modulated data to a radio frequency and transmits the resultant to the mobile station. Also, the radio unit 104 receives uplink data from the mobile station, downconverts it to a base band signal, and outputs the received data to the channel estimation unit 105, the DFT-S-OFDM demodulation unit 106 and the preamble detection unit 108.

The channel estimation unit 105 estimates a radio propagator path characteristic based on an uplink pilot channel UPiCH and outputs the estimation result to the DFT-S-OFDM demodulation unit 106. Also, the channel estimation unit 105 outputs the estimation result of the radio propagation path to the scheduling unit 103 for the scheduling of the uplink. Incidentally, the communication system of the unlink is herein assumed to be a single charier system such as DFT-S-OFDM but may be a multicarrier system such as OFDM.

The DFT-S-OFDM demodulation unit 106 demodulates the received data input from the radio unit 104 in accordance with the estimation result of the radio propagation path supplied from the channel estimation unit 105. The control data extraction unit 107 separates the received data to user data (of an uplink shared channel UL-SCH) and control data (of a physical uplink control channel PUCCH). Then, the control data extraction unit 107 outputs CQI information of the downlink, out of the separated control data, to the scheduling unit 103 and outputs the other control data and the user data to the upper layer.

The preamble detection unit 108 detects a preamble, calculates synchronization timing shift and reports a signature ID number and the synchronization timing shift to the upper layer. At this point, when the signature ID number accords with a signature informed by the signature management unit 109, a dedicated signature flag is set to "1", and when it is a signature not informed by the signature management unit 109, the dedicated signature flag is set to "0". Furthermore, when the signature ID number accords with the signature informed by the signature management unit 109, the preamble detection unit 108 reports to the upper layer that the preamble of the signature ID number informed by the signature management unit 109 has been detected.

The signature management unit 109 selects a signature in accordance with an instruction issued by the upper layer, and forms the upper layer of the ID number (the signature ID number) of the selected signature. Furthermore, the signature management unit 109 informs the preamble detection unit 108 of the selected signature. Incidentally the signature management 109 checks signature ID numbers currently used and selects a signature from signatures excluding those used. The signature management unit 109 stores the selected signature ID number and deletes the signature detected by the preamble detection unit 108 from a stored content.

The base station 100 having the aforementioned configuration is controlled by the upper layer so as to execute processing through procedures illustrated in FIGS. 3 through 9 described later.

On the other hand, the mobile station 200 includes, as illustrated in FIG. 2, a data control unit 201, a DFT-S-OFDM modulation unit 202, a scheduling unit 203, a signature selection unit 204, a preamble generation unit 205, a synchronization correction unit 206, a radio unit 207, a channel estimation unit 208, an OFDM demodulation unit 209 and a control data extraction unit 210.

The data control unit 201 accepts input of user data and control data and maps these data in an uplink scheduling channel in accordance with an instruction issued by the scheduling unit 203. The DFT-S-OFDM modulation unit 202 performs data modulation and DFT-S-OFDM signal processing such as DFT conversion, subcarrier mapping, IFFT conversion, CP (Cyclic Prefix) insertion and filtering, so as to generate a DFT-Spread-OFDM signal. Incidentally, the communication system of the uplink is herein assumed to be a single charmer system such as the DFT-Spread OFDM but may be a multicarrier system such as the OFDM.

The scheduling unit 203 performs scheduling for mapping the user data in respective channels of the uplink based on CQI information supplied by the channel estimation unit 208 described later and scheduling information supplied by an upper layer. The signature selection unit 204 selects a signature ID number to be used in a random access in accordance with an instruction issued by the upper layer. Then, the signature selection unit 204 outputs the selected signature ID number to the preamble generation unit 205.

The preamble generation unit 205 generates a preamble by using the signature ID number selected by the signature selection unit 204 and outputs the generated preamble to the DFT-S-OFDM modulation unit 202. The synchronization correction unit 206 determines transmission timing on the basis of synchronization information input from the control data extraction unit 210 and outputs data modulated in accordance with the transmission timing to the radio unit 207.

The radio unit 207 upconverts the modulated data to a radio frequency and transmits the resultant to the base station 100. Furthermore, the radio unit 207 receives downlink data from the base station 100, downconverts the received data to a base band signal, and outputs the received data to the OFDM demodulation unit 209. The channel estimation unit 208 estimates a radio propagation path characteristic on the basis of a downlink pilot channel and outputs the obtained estimation result to the OFDM demodulation unit 209. Furthermore, the channel estimation unit 208 converts the estimation result to CQI information for informing the base station 100 of the estimation result of the radio propagation path and outputs the CQI information to the scheduling unit 203.

The OFDM demodulation unit 209 demodulates the received data input from the radio unit 207 in accordance with the estimation result of the radio propagation path input from the channel estimation unit 208. The control data extraction unit 210 separates the received data to user data and control data. Then, the control data extraction unit 210 outputs scheduling information included in the separated control data to the scheduling unit 203, outputs synchronization information of the uplink to the synchronization correction unit 206 and outputs the remaining control data and the user data to the upper layer.

The mobile station 200 having the aforementioned configuration is controlled by the upper layer so as to execute the processing through the procedures illustrated in FIGS. 3 through 7 and FIG. 10 described later.

Next, an operation performed, in the communication system including the base station 100 and the mobile station 200 having the aforementioned configurations, for resuming downlink data transmission to the mobile station 200 out of uplink synchronization will be described with reference to FIGS. 3 through 5.

FIG. 3 is a sequence chart illustrating an operation performed when the base station 100 of this embodiment transmits a dedicated signature by using a DL-SCH and the mobile station 200 succeeds in the CRC of the DL-SCH. FIG. 4 is a sequence chart illustrating an operation performed when the base station 100 of this embodiment transmits a dedicated signature by using a DL-SCH and the mobile station 200 fails in the CRC of the DL-SCH. FIG. 5 is a sequence chart illustrating an operation performed when the base station 100 of this embodiment does not transmit a dedicated signature by using a DL-SCH.

First, the operation performed when the base station 100 of this embodiment transmits a dedicated signature by using a DL-SCH and the mobile station 200 succeeds in the CRC of the DL-SCH will be described with reference to FIG. 3. The base station 100 manages the uplink synchronization of the mobile station 200. For example, a timer is set, and when a state where uplink transmission is not performed or a state where uplink synchronization information is not updated has continued for a given period of time, it is determined that "the mobile station 200 is out of uplink synchronization". Similarly, the mobile station 200 also manages the uplink synchronization.

When the base station 100 detects arrival of data for the mobile station 200 out of uplink synchronization (ST301), it transmits downlink resource allocation and downlink data (ST302 and ST304). At this point, the downlink resource allocation is transmitted by using an L1/L2 control channel and the downlink data is transmitted by using a downlink-shared channel DL-SCH. It is noted that the DL-SCH includes information for specifying a dedicated signature.

When the mobile station 200 receives the downlink resource allocation and the downlink data, it performs the CRC of the L1/L2 control channel and the DL-SCH. In this exemplary case, the mobile station 200 detects success in the CRC of both the channels (ST303 and ST305). Then, when the mobile station 200 detects the downlink resource allocation and the dedicated signature, it transmits a preamble of a random access channel by using the dedicated signature (ST306: Message 1).

When the base station 100 detects the dedicated signature by using the random access channel, it transmits a preamble response (ST307: Message 2). In this exemplary case, the base station 100 can specify the mobile station 200 through the detection of the dedicated signature and specifies C-RNTI, that is, identification information of the mobile station 200.

The preamble response includes the L1/L2 control channel and the DL-SCH. The L1/L2 control channel includes RA-RNTI used for identifying the preamble response or C-RNTI used for directly specifying the mobile station 200. The DL-SCH includes synchronization information. When the RA-RNTI is used, the DL-SCH includes the dedicated signature or the C-RNTI.

After transmitting the preamble response, the base station 100 subsequently resumes general data transmission (ST308 and ST309). When the base station 100 transmits the dedicated signature by using a DL-SCH and the mobile station 200 succeeds in the CRC of the DL-SCH, the operation for resuming downlink data transmission to the mobile station 200 out of uplink synchronization is performed in this manner.

Incidentally, the downlink data transmitted in ST304, the preamble response transmitted in ST307 and the downlink data transmitted in ST309 may include user data having arrived at the base station 100. In this case, the preamble transmit ted in ST306 functions as HARQ ACK of the downlink data transmitted in ST304.

Next, the operation performed when the base station 100 transmits a dedicated signature by using a DL-SCH and the mobile station 200 fails in the CRC of the DL-SCH will be described with reference to FIG. 4. As described with reference to FIG. 3, the base station 100 manages the uplink synchronization of the mobile station 200. Similarly, the mobile station 200 also manages the uplink synchronization.

When the base station 100 detects arrival of data for the mobile station 200' out of uplink synchronization (ST401), it transmits downlink resource allocation and downlink data (ST402 and ST404). At this point, the downlink resource allocation is transmitted by using an L1/L2 control channel and the downlink data is transmitted by using a downlink-shared channel DL-SCH. It is noted that the DL-SCH includes information for specifying a dedicated signature.

When the mobile station 200 receives the downlink resource allocation and the downlink data, it performs the CRC of the L1/L2 control channel and the DL-SCH. In this exemplary case, the mobile station 200 detects success in the CPC of the former channel but detects fail in the CRC of the latter channel (ST403 and ST405) Then, when the mobile station 200 detects the downlink resource allocation, it transmits a preamble of a random access channel by using a signature randomly selected (ST406: Message 1).

When the base station 100 detects the signature by using the random access channel, it transmits a preamble response (ST407: Message 2). In this exemplary case, the base station 100 cannot specify the mobile station 200 through the detection of the signature. The preamble response includes the L1/L2 control channel and the DL-SCH. The L1/L2 control channel includes RA-RNTI used for identifying the preamble response. The DL-SCH includes mapping information for synchronization information and a signature, mapping information for the signature and new C-RNTI (T-C-RNTI) and scheduling information for Message 3. At this point, the base station 100 cannot grasp the reason why the mobile station 200 has performed the random access.

When the mobile station 200 receives the preamble response, it transmits Message 3 in accordance with the scheduling information for Message 3 (ST408: Message 3). Message 3 includes C-RNTI. When the base station 100 receives the C-RNTI, it detects that the message is a response from the mobile station 200 specified by the downlink resource allocation transmitted in ST402 and the downlink data transmitted in ST404.

Furthermore, when the base station 100 receives Message 3, it transmits contention resolution as contention resolution information to be used when a plurality of mobile stations 200 simultaneously perform transmission by using the same signature in the preamble transmitted in ST406 (ST409: Message 4). The L1/L2 control channel or Message 4 includes the T-C-RNTI specified by the base station 100 in Message 2, and the DL-SCH includes mobile station identification information detected by the base station 100 in Message 3.

After transmitting the contention resolution, the base station 100 subsequently resumes general data transmission (ST410 and ST411). When the base station 100 transmits a dedicated signature by using a DL-SCH and the mobile station 200 fails in the CRC of the DL-SCH, the operation for resuming downlink data transmission to the mobile station 200 out of uplink synchronization is performed in this manner.

Incidentally, the downlink data transmitted in ST404 may include user data having arrived at the base station 100. When the user data is thus included, the HARQ may be employed for the downlink data transmitted in ST404 and the downlink data transmitted in ST411. In this case, Message 3 transmitted in ST408 functions as HARQ MACK of the downlink data transmitted in ST404.

The aforementioned operation performed in the communication system is similarly executed also when the base station 100 does not transmit a dedicated signature by using a DL-SCH and the mobile station 200 fails in the CRC of the DL-SCH.

Next, the operation performed when the base station 100 does not transmit a dedicated signature by using a DL-SCH and the mobile station 200 succeeds in the CRC of the DL-SCH will be described with reference to FIG. 5. As described with reference to FIGS. 3 and 4, the base station 100 manages the uplink synchronization of the mobile station 200. Similarly, the mobile station 200 also manages the uplink synchronization.

When the base station 100 detects arrival of data for the mobile station 200 out of uplink synchronization (ST501), it transmits downlink resource allocation and downlink data (ST502 and ST504). At this point, the downlink resource allocation is transmitted by using an L1/L2 control channel and the downlink data is transmitted by using a downlink-shared channel DL-SCH.

It is noted that the DL-SCH includes information indicating that no dedicated signature is allocated in resuming the downlink data transmission. The information indicating that no dedicated signature is allocated may be not only addition of information but also detection by the mobile station 200 of no dedicated signature included in the data or of a signature not reserved as a dedicated signature included in the data.

When the mobile station 200 receives the downlink resource allocation and the downlink data, it performs the CRC of the L1/L2 control channel and the DL-SCH. In this exemplary case, the mobile station 200 detects success in the CRC of both the channels (ST503 and ST505). Then, when the mobile station 200 detects the downlink resource allocation and the information indicating that no dedicated signature is allocated, it transmits a preamble of a random access channel by using a signature randomly selected (ST506: Message 1).

When the base station 100 detects the signature by using a random access channel, it transmits a preamble response (ST507: Message 2). In this case, the base station 100 cannot specify the mobile station 200 through the detection of the signature. The preamble response includes the L1/L2 control channel and the DL-SCH. The L1/L2 control channel includes RA-RNTI used for identifying the preamble response. The DT-CCH includes mapping information for synchronization information and a signature, mapping information for the signature and new C-RNTI (T-C-RNTI) and scheduling information for Message 3. At this point, the base station 100 cannot grasp the reason why the mobile station 200 has performed the random access.

When the mobile station 200 receives the preamble response, it transmits Message 3 in accordance with the scheduling information for Message 3 (ST508: Message 3). Message 3 includes C-RNTI. When the base station 100 receives the C-RNTI, it detects that the message is a response from the mobile station 200 specified by the downlink resource allocation transmitted in ST502 and the downlink data transmitted in ST504.

Furthermore, when the base station 100 receives Message 3, it transmits contention resolution as contention resolution information to be used when a plurality of mobile stations 200 simultaneously perform transmission by using the same signature in the preamble transmitted in ST506 (ST509: Message 4). The L1/L2 control channel of Message 4 includes the T-C-RNTI specified by the base station 100 in Message 2, and the DL-SCH includes mobile station identification information detected by the base station 100 in Message 3.

After transmitting the contention resolution, the base station 100 subsequently resumes general data transmission (ST510 and ST511). When the base station 100 does not transmit a dedicated signature by using a DL-SCH and the mobile station 200 succeeds in the CRC of the DL-SCH, the operation for resuming downlink data transmission to the mobile station 200 out of uplink synchronization is performed in this manner.

Incidentally, the downlink data transmitted in ST504 may include user data having arrived at the base station 100. When the user data is thus included, the HARQ may be employed for the downlink data transmitted in ST504 and the downlink data transmitted in ST511. In this case, Message 3 transmitted in ST508 functions as HARQ ACK or NACK.

The aforementioned operation performed in the communication system is similarly executed when the base station 100 does not transmit a dedicated signature by using a DL-SCH and the mobile station 200 fails in the CRC of the DL-SCH.

As described with reference to FIGS. 4 and 5, when the base station 100 transmits neither a dedicated signature by using a DL-SCH nor downlink data, the same operation is executed no matter whether the mobile station 200 succeeds or fails in the CRC of the DL-SCH. In other words, the transmission of the DL-SCH may be omitted in such a case.

Accordingly, as an alternative operation, the base station 100 does not transmit the downlink data in ST404 or ST504 so that the mobile station 200 can always fail in the CRC. Thus, the mobile station 200 can be informed of allocation of no dedicated signature without using the downlink resource. Now, an operation for resuming the downlink data transmission to the mobile station 200 out of uplink synchronization performed in this case will be described with reference to FIG. 6.

As illustrated in FIG. 6, when the base station 100 detects arrival of data for the mobile station 200 out of uplink synchronization (ST601), it transmits downlink resource allocation (ST602). At this point, the downlink resource allocation is transmitted by using an L1/L2 control channel. It is noted that no downlink data is transmitted.

When the mobile station 200 receives the downlink resource allocation, it performs the CRC of the L1/L2 control channel and the DL-SCH. In this exemplary case, the mobile station 200 detects success in the CRC of the former channel but detects fail in the CRC of the latter channel (ST603 and ST604). Then, when the mobile station 200 detects the downlink resource allocation, it transmits a preamble of a random access channel by using a signature randomly selected (ST605: Message 1). Naturally, since a dedicated signature is not included in the DL-SCH, the mobile station 200 does not perform the CRC of the DL-SCH, and when it detects the downlink resource allocation (ST603), it transmits a preamble a random access channel by using a signature randomly selected (ST605).

Furthermore, the L1/L2 control channel is a channel used also for transmitting uplink resource allocation. In general, the mobile station 200 having received uplink resource allocation transmits a UL-SCH. The mobile station 200 out of uplink synchronization, however, similarly performs a contention base random access when it detects the uplink resource allocation. In other words, the mobile station 200 out of uplink synchronization perform a random access when it detects any resource allocation (uplink or downlink resource allocation). The resource allocation herein includes allocation for persistent scheduling (allocated by specifying a frequency and a time area using a signal of the upper layer). Thus, the base station 100 can instruct the mobile station 200 to perform a random access through a simple operation.

When the base station 100 detects a signature by using a random access channel, it transmits a preamble response (ST606: Message 2). The base station 100 cannot specify the mobile station 200 through detection of the signature. The preamble response includes the L1/L2 control channel and the DL-SCH. The L1/L2 control channel includes RA-RNTI used for identifying the preamble response. The DL-SCH includes mapping information for synchronization information and a signature, mapping information for the signature and new C-RNTI (T-C-RNTI) and scheduling information for Message 3. At this point, the base station 100 cannot grasp the reason why the mobile station 200 has performed the random access.

When the mobile station 200 receives the preamble response, it transmits Message 3 in accordance with the scheduling information for Message 3 (ST607: Message 3). Message 3 includes C-RNTI. When the base station 100 receives the C-RNTI, it detects that the message is a response from the mobile station 200 specified by the downlink resource allocation transmitted in ST602.

Furthermore, when the base station 100 receives Message 3, it transmits contention resolution as contention resolution information to be used when a plurality of mobile stations 200 simultaneously perform transmission by using the same signature in the preamble transmitted in ST605 (ST608: Message 4). The L1/L2 control channel of Message 4 includes the T-C-RNTI specified by the base station 100 in Message 2, and the DL-SCH includes mobile station identification information detected by the base station 100 in Message 3.

After transmitting the contention resolution, the base station 100 subsequently resumes general data transmission (ST609 and ST610). When the base station 100 omits the transmission of the DL-SCH, the operation for resuming downlink data transmission to the mobile station 200 out of uplink synchronization is performed in this manner.

At this point, an operation performed when the mobile station 200 of this embodiment fails in the CRC of the L1/L2 control channel will be described with reference to FIG. 7. As described with reference to FIGS. 3 through 5, the base station 100 manages the uplink synchronization of the station 200. Similarly, the mobile station 200 also manages the uplink synchronization.

When the base station 100 detects arrival of data for the mobile station 200 out of uplink synchronization (ST701) it transmits downlink resource allocation and downlink data (ST702 and ST704). At this point, the downlink resource allocation is transmitted by using an L1/L2 control channel and the downlink data is transmitted by using a downlink-hared channel DL-SCH.

When the mobile station 200 receives the downlink resource allocation and the downlink data, it performs the CRC of the L1/L2 control channel and the DL-SCH. In this exemplary case, the mobile station 200 detects fail in the CRC of both the channels (ST703 and ST705). Since the downlink resource allocation cannot be detected, the mobile station 200 halts receiving until the next receiving cycle, so as to receive the L1/L2 control channel again.

When the base station 100 does not receive a response from the mobile station 200 within a prescribed window time (whereas the response is made by different methods depending upon the aforementioned situations described with reference to FIGS. 4 through 6), it detects that the mobile station 200 could not receive the downlink resource allocation (ST706). Then, when the base station 100 detects that the mobile station 200 could not receive the data, it waits for the next transmitting cycle, so as perform the operation for resuming the downlink data transmission to the mobile station 200 out of uplink synchronization again (ST707 and ST708).

In this manner, in the communication system of this embodiment, various operations are precedently prepared in accordance with situations of allocating a dedicated signature by the base station 100, and therefore, downlink data transmission can be efficiently resumed no matter whether a dedicated signature can be allocated.

Now, an operation performed by the base station 100 of this embodiment for resuming downlink data transmission to the mobile station 200 out of uplink synchronization be described. FIG. 8 is a flowchart used for explaining an operation performed by the base station 100 of this embodiment for resuming downlink data transmission to the mobile station 200 out of uplink synchronization.

As illustrated in FIG. 8, when the base station 100 detects resume of downlink data transmission (ST801), it checks the uplink synchronization of the mobile station 200 (ST802). When the mobile station 200 is not out of uplink synchronization, the base station 100 performs general data transmission (ST810). On the other hand, when the mobile station 200 out of uplink synchronization, the base station 100 checks whether or not a dedicated signature can be allocated (ST803).

At this point, when a dedicated signature can be allocated, the base station 100 selects a dedicated signature (ST804), and transmits downlink resource allocation and downlink data to the mobile station 200 (ST805 and ST806). The downlink data includes the dedicated signature.

On the other hand, when a dedicated signature cannot be allocated, the base station 100 transmits at least downlink resource allocation to the mobile station 200 (ST807). Then, the base station 100 transmits, to the mobile station 200, downlink data including information indicating that no dedicated signature is allocated or transmits no downlink data (ST808). After transmitting the downlink data in ST806 or the like, the base station 100 determines whether or not a response is received from the mobile station 200 within a prescribed window time (ST809). When the response is not received, the processing returns to ST803, so that the base station 100 can execute the processing of and after ST803.

Next, an operation performed by the base station 100 of this embodiment for random access control will be described. FIG. 9 is a flowchart used for explaining the operation performed by the base station 100 of this embodiment for the random access control.

As illustrated in FIG. 9, when the base station 100 receives a preamble by using a random access channel (ST901), it checks whether or not the preamble is a dedicated signature (ST902). At this point, when the preamble is a dedicated signature, the base station 100 transmits a preamble response (ST903) and continues data transmission (ST909).

On the other hand, when the preamble is not a dedicated signature, the base station 100 transmits a preamble response including scheduling information for Message 3 (ST904) and starts processing for receiving Message 3. When Message 3 is received (ST905), the base station 100 checks whether or not Message 3 includes C-RNTI of the mobile station 200 for resuming downlink data transmission (ST906).

At this point, when C-RNTI of a mobile station 200 other than the mobile station 200 corresponding to the target of the resume of downlink data transmission or another ID is detected, random access processing derived from another cause is performed (ST907). On the contrary, when the C-RNTI of the mobile station 200 corresponding to the target of the resume of downlink data transmission is detected, the base station 100 transmits contention resolution to the mobile station 200 (ST908) and continues the data transmission (ST909).

Next, an operation performed by the mobile station 200 of this embodiment out of uplink synchronization for resuming downlink data transmission will be described. FIG. 10 is a flowchart used for explaining the operation performed by the mobile station 200 of this embodiment out of uplink synchronization for resuming downlink data transmission.

Illustrated in FIG. 10, when the mobile station 200 detects its own C-RNTI by using an L1/L2 control channel (ST1001), it checks uplink synchronization (ST1002). When the mobile station 200 is not out of uplink synchronization, it performs general data receipt (ST1012). On the other hand, when the mobile station 200 is out of uplink synchronization, it receives downlink data (ST1003) and determines whether or not the CRC has succeeded (ST1004).

When the CRC has failed, the mobile station 200 transmits a preamble by using a signature randomly selected (ST1005). Naturally, if a dedicated signature is not included in a DL-SCH, when the mobile station 200 detects its own C-RNTI by using the L1/L2 control channel (ST1001), it checks the uplink synchronization. When it is determined that the mobile station 200 is out of synchronization (ST1012), it transmits a preamble by using a signature randomly selected (ST1005). After transmitting the preamble by using the signature randomly selected, the mobile station 200 receives a preamble response (Message 2) from the base station 100 (ST1006).

Then, the mobile station 200 acquires, from the preamble response (Message 2), mapping information for synchronization information and a signature, mapping information for the signature and new C-RNTI (T-C-RNTI) and scheduling information for Message 3, and transmits Message 3 including its own C-RNTI (ST1007). After transmitting Message 3, the mobile station 200 receives contention resolution (Message 4) from the base station 100 (ST1008). Thereafter, the mobile station 200 continues the data receipt (ST1012).

On the other hand, when the CRC has succeeded in ST1004, the mobile station 200 checks whether or not a dedicated signature is included in the downlink data (ST1009). Incidentally, when a dedicated signature is not included, the mobile station 200 transmits a preamble by using a signature randomly selected (ST1005).

When a dedicated signature is included, the mobile station 200 transmits a preamble by using the dedicated signature (ST1010). After transmitting the preamble by using the dedicated signature, the mobile station 200 receives a preamble response (Message 2) from the base station 100 (ST1011). Then, the mobile station 200 acquires the synchronization information from the preamble response (Message 2) and continues the data receipt (ST1012).

In this manner, in the communication system of this embodiment, the mobile station 200 perform a random access by using a different signature depending upon the information included in a DL-SCH and the check result of the CRC of the DL-SCH, and it is determined whether or not contention resolution is transmitted by the base station 100 depending upon a signature used in the random access before transmitting downlink data. Therefore, the downlink data transmission can be resumed while assuming the occurrence of contention with another mobile station 200 depending upon a signature selected by the mobile station 200, and hence, an efficient procedure can be realized for resuming the downlink data transmission no matter whether a dedicated signature can be allocated.

Although both the mobile station 200 and the base station 100 manage the uplink synchronization with a timer in the above description of the communication system or this embodiment, the invention is applicable also when the base station 100 detects that the mobile station is out of uplink synchronization and issues an uplink synchronization request. Now, the case where the base station 100 detects that the mobile station 200 is out of uplink synchronization and issues an uplink synchronization request will be described.

A base station periodically monitors an uplink pilot channel UPiCH from a mobile station so as to generate synchronization information. The base station detects shift between the arrival time of the uplink pilot channel and the base time so as to set a value of the shift as the synchronization information. When the subcarrier is 15 kHz and the OFDM symbol is 70 microseconds, the granularity of the information of timing shift is, for example, 0.52 microsecond. In general, the uplink synchronization is kept by periodically transmitting the synchronization information from the base station to the mobile station. When the synchronization information exceeds the tolerance in keeping the uplink synchronization, however, the base station determines whether or not uplink resynchronization through a random access is necessary.

FIG. 11 is a sequence chart illustrating an operation performed when the base station 100 of this embodiment transmits an uplink synchronization request and a dedicated signature for uplink resynchronization (hereinafter referred to as the "dedicated signature") by using a DL-SCH and the mobile station 200 succeeds in the CRC of the DL-SCH. FIG. 12 is a sequence chart illustrating an operation performed when the base station 100 of this embodiment transmits an uplink synchronization request by using a DL-SCH and the mobile station 200 fails in the CRC of the DL-SCH. FIG. 13 is a sequence chart illustrating an operation performed when the base station 100 of this embodiment transmits an uplink synchronization request by using a DL-SCH.

First, the operation performed when the base station 100 of this embodiment transmits an uplink synchronization request and a dedicated signature by using a DL-SCH and the mobile station 200 succeeds in the CRC of the DL-SCH will be described with reference to FIG. 11. The base station 100 manages the uplink synchronization of the mobile station 200. The base station 100 determines whether or not uplink resynchronization through random access is necessary, for example, on the basis of the physical properties of the uplink transmitted from the mobile station 200.

When the base station 100 determines that the uplink resynchronization is necessary (ST1101), it transmits downlink resource allocation and downlink data (ST1102 and ST1104). At this point, the downlink resource allocation is transmitted by using an L1/L2 control channel and the downlink data is transmitted by using a downlink-shared channel DL-SCH. It is noted that the DL-SCH includes an uplink synchronization request and information for specifying a dedicated signature.

When the mobile station 200 receives the downlink resource allocation and the downlink data, it performs the CRC of the L1/L2 control channel and the DL-SCH. In this exemplary case, the mobile station 200 detects success in the CRC of the both channels (ST1103 and ST1105). Then, when the mobile station 200 detects the downlink resource allocation, the uplink synchronization request and the dedicated signature by referring to data included in the DL-SCH (ST1106), it performs dedicated signature random access processing by using the dedicated signature (ST1107). This processing is performed in the same manner as in ST306 and ST307 of FIG. 3. Incidentally, HARQ ACK generally transmitted by using a PUCCH in receiving a DL-SCH is not transmitted when an uplink synchronization request is detected. When the dedicated signature random access processing is performed, communication of uplink data and downlink data is resumed (ST1108).

Next, the operation performed when the base station 100 transmits an uplink synchronization request by using a DL-SCH and the mobile station 200 fails in the CRC of the DL-SCH will be described with reference to FIG. 12. As described with reference to FIG. 11, the base station 100 manages the uplink synchronization of the mobile station 200.

When the base station 100 determines that the uplink resynchronization is necessary (ST1201), it transmits downlink resource allocation and downlink data (ST1202 and ST1204). At this point, the downlink resource allocation is transmitted by using an L1/L2 control channel and the downlink data is transmitted by using a downlink-shared channel DL-SCH. It is noted that the DL-SCH includes an uplink synchronization request.

When the mobile station 200 receives the downlink resource allocation and the downlink data, it performs the CRC of the L1/L2 control channel and the DL-SCH. In this exemplary case, the mobile station 200 detects success in the CRC of the former channel but fail in the CRC of the latter channel (ST1203 and ST1205). Then, when the mobile station 200 detects the downlink resource allocation, it transmits HARQ NACK by using a PUCCH (ST1206). In this case, the NACK is transmitted without timing adjustment. Since this signal has low reliability, the base station 100 transmits an uplink synchronization request again if it waits for a random access performed by the mobile station 200 and the random access is not performed.

Since the transmission of the NACK out of synchronization does not frequently occur and does not seriously affect another mobile station, is acceptable as it is but if it necessary to avoid the transmission of the NACK, the following method is employed: The base station 100 adds, to the information of the L1/L2 control channel, information indication that NACK is not to be transmitted. For example, the following arrangement is set with the mobile station 200: Since a DL-SCH used for uplink resynchronization does not use HARQ, an HARQ process number corresponding to an information field of the HARQ and one of information strings of HARQ Redundancy Version (of, for example, all 0) are reserved, and when the reserved information is included in the information field of the HARQ, NACK is not transmitted. Alternative, arrangement that one bit is simply added to an L1/L2 control channel so as not to transmit NACK is set with the mobile station 200. Thus, the base station 100 can avoid the transmission of NACK from a mobile station out of synchronization, so as to reduce interference with another mobile station. When this method is employed, even if the mobile station does not manage the synchronization with a timer, the mobile station can detect, receiving an L1/L2 control channel, that it is a DL-SCH for uplink resynchronization. In other words when an L1/L2 control channel is received, the mobile station can perform a contention base random access by failing in the CRC of the DL-SCH.

Next, the operation performed when the base station 100 transmits an uplink synchronization request by using a DL-SCH will be described with reference to FIG. 13. As described with reference to FIGS. 11 and 12, the base station 100 manages the uplink synchronization of the mobile station 200.

When the base station 100 determines that uplink resynchronization is necessary (ST1301), it transmits downlink resource allocation and downlink data (ST1302 and ST1304). At this point, the downlink resource allocation is transmitted by using an L1/L2 control channel and the downlink data is transmitted by using a downlink-shared channel DL-SCH.

It is noted that the DL-SCH includes information that no dedicated signature is allocated in the uplink resynchronization. The information indicating that no dedicated signature is allocated may be not only addition of information but also detection by the mobile station 200 of no dedicated signature included in the data or of a signature not reserved as a dedicated signature included in the data.

When the mobile station 200 receives the downlink resource allocation and the downlink data, it performs the CRC of the L1/L2 control channel and the DL-SCH. In this exemplary case, the mobile station 200 detects success in the CRC of both the channels (ST1303 and ST1305). Then, when the mobile station 200 detects the downlink resource allocation, uplink synchronization request and the information of no dedicated signature (ST1306), it performs contention base random access processing by using a signature randomly selected (ST1307). This processing is performed in the same manner as in ST506 through ST509 of FIG. 5. Incidentally, HARQ ACK generally transmitted by using a PUCCH in receiving DL-SCH is not transmitted when an uplink synchronization request is detected. When the contention base random access processing is performed, communication of uplink data and downlink data is resumed (ST1308).

Next, an operation performed by the mobile station 200 of this embodiment for uplink resynchronization will be described. FIG. 14 is a flowchart used for explaining the operation performed by the mobile station 200 of this embodiment for the uplink resynchronization.

As illustrated in FIG. 14, when the mobile station 200 detects its own C-RNTI by using an L1/L2 control channel (ST1401), it receives downlink data (ST1042) and determines whether or not the CRC has succeeded (ST1403).

At this point, when the mobile station 200 has failed in the CRC, it transmits HARQ NACK (ST1404). When information of the L1/L2 control channel includes information that NACK is not to be transmitted, the mobile station 200 does not transmit the NACK. When the mobile station 200 has succeeded in the CRC, it checks whether or not an uplink synchronization request is included in the data (ST1405). When an uplink synchronization request is not included, the mobile station 200 transmits HARQ ACK (ST1406). When an uplink synchronization request is included, the mobile station 200 further checks whether or not a dedicated signature is included in the downlink data (ST1407).

At this point, when a dedicated signature is not included, the mobile station 200 transmits a preamble by using a signature randomly selected (ST1408). After transmitting the preamble by using the randomly selected signature, the mobile station 200 receives a preamble response (Message 2) from the base station 100 (ST1409). Then, the mobile station 200 acquires, from the preamble response (Message 2), mapping information for synchronization information and a signature, mapping information for the signature and new C-RNTI (T-C-RNTI) and scheduling information for Message 3, and transmits Message 3 including its own C-RNTI (ST1410). After transmitting Message 3, the mobile station 200 receives contention resolution (Message 4) from the base station 100 (ST1411). Thereafter, the mobile station 200 continues data transmission/receipt (ST1412).

On the other hand, when a dedicated signature is determined to be included in ST1407, the mobile station 200 transmits a preamble by using the dedicated signature (ST1413). After transmitting the preamble by using the dedicated signature, the mobile station 200 receives a preamble response (Message 2) from the base station (ST1414). Then, the mobile station 200 acquires synchronization information from the preamble response (Message 2) and continues data transmission/receipt (ST1412).

Now, an operation performed when the continuation of uplink synchronization is managed with timer as described above and an operation performed when an uplink synchronization request is received from the base station 100 will be described with reference to FIG. 15. FIG. 15 is a flowchart used for explaining the operations performed by the mobile station 200 of this embodiment when the continuation of uplink synchronization is managed with a timer and when an uplink synchronization request is received from the base station 100. It is noted that like reference numerals are used in FIG. 15 to refer to like steps illustrated in FIGS. 10 and 14 so as to omit the description.

As illustrated in FIG. 15, when the mobile station 200 detects its own C-RNTI by an L1/L2 control channel (ST1501), it determines whether or not a timer used for managing the continuation of uplink synchronization has expired (ST1502). When the timer used for managing the continuation of the uplink synchronization has expired, the mobile station 200 performs the processing of and after ST1003 illustrated in FIG. 10. On the other hand, when the timer used for managing the continuation of the uplink synchronization has not expired, the mobile station 200 performs the processing of and after ST1402 illustrated in FIG. 14.

FIG. 16 is a block diagram illustrating a part of the configuration of the upper layer of the mobile station 200 of this embodiment. An uplink synchronization management unit 1601 manages uplink synchronization on the basis of a DL-SCH received from the base station 100, and instructs a CRC result discrimination unit 1602 to perform the processing illustrated in FIG. 10 or 14 depending upon whether or not the uplink synchronization is kept. When a timer used for managing the uplink synchronization has expired, it instructs to perform the processing illustrated in FIG. 10, and when not, it instructs to perform the processing illustrated in FIG. 14.

The CRC result discrimination unit 1602 performs the CRC of the DL-SCH and discriminates the result of the check. When the CRC fails and the mobile station is out of uplink synchronization, the CRC result discrimination unit 1602 instructs a random access execution unit 1603 to execute a contention base random access. In the other case, it instructs a random access discrimination unit 1604 to determine whether or not a random access is necessary.

The random access discrimination unit 1604 checks whether or not an uplink synchronization request or a dedicated signature is included in the DL-SCH, and instructs to transmit HARQ ACK/NACK or instructs the random access execution unit 1603 to execute a dedicated signature random access or a contention base random access in accordance with information included in the DL-SCH. The random access execution unit 1603 executes the random access in accordance with the instruction issued by the CRC result discrimination unit 1602 or the random access discrimination unit 1604.

In this manner, in the communication system according to this embodiment, a DL-SCH including an uplink synchronization request and information for specifying a dedicated signature is received, and when the CRC of the DL-SCH succeeds, a random access is performed by using the dedicated signal, and the base station 100 transmits downlink data without transmitting contention resolution. On the other hand, when the received DL-SCH includes an uplink synchronization request but does not include the information for specifying a dedicated signature, a random access is performed by using a signature randomly selected, and the base station 100 transmits downlink data after transmitting contention resolution. Since the mobile station 200 performs a random access when a DL-SCH including an uplink synchronization request is received from the base station 100 in this manner, even when the mobile station 200 does not recognize that it is out of uplink synchronization, uplink resynchronization can be realized.

Incidentally, being out of uplink synchronization detected on the side of the base station 100 corresponds to a state where the base station 100 determines that it is necessary to attain resynchronization with the mobile station 200 through a random access no matter whether the mobile station 200 actually out of uplink synchronization.

As described so far, according to the present embodiment, a random access is performed by a mobile station apparatus by using a different signature depending upon information included in a DL-SCH and a result of the CRC of the DL-SCH, and a base station apparatus transmits downlink data after determining whether or not contention resolution is transmitted depending upon the signature used in the random access. Therefore, resume of downlink data transmission or uplink resynchronization can be performed in accordance with a signature selected by the mobile station apparatus on the assumption of occurrence of contention with another mobile station apparatus, and hence, an efficient procedure can be realized when the mobile station apparatus is out of uplink synchronization no matter whether a dedicated signature can be allocated.

The present invention is not limited to the above-described embodiment but may be variously modified. In this embodiment, sizes, shapes and the like of elements illustrated in the accompanying drawings are not particularly specified but may be appropriately modified as far as the effects of the invention can be exhibited. It is to be understood that changes and variations may be made without departing from the spirit or scope of the invention.

The invention claimed is:

1. A mobile station apparatus comprising:
processing circuitry configured to:
  select a random access method in response to receiving, from a base station apparatus, information that includes a signature, and
  perform a random access according to the selected random access method;
wherein the random access according to the selected random access method is performed by using a dedicated signature when the dedicated signature is detected by said mobile station apparatus as being the signature in the information; and
wherein the random access according to the selected random access method is performed by using a randomly selected signature when a signature not reserved as a dedicated signature is detected by said mobile station apparatus as being the signature in the information.

2. The mobile station apparatus according to claim 1, wherein
the information further includes an uplink synchronization request.

3. The mobile station apparatus according to claim 1, wherein
the randomly selected signature is selected by the mobile station apparatus.

4. The mobile station apparatus according to claim 1, wherein
in the case that the signature not reserved as a dedicated signature is included in the information, the information does not include further information, and the signature not reserved as a dedicated signature is included in the information in place of the dedicated signature.

5. The mobile station apparatus according to claim 1, wherein
the dedicated signature, the randomly selected signature and the signature not reserved as a dedicated signature stem from a same set of 64 signatures.

6. The mobile station apparatus according to claim 1, wherein
the signature not reserved as a dedicated signature does not define a maximum signature of a set of signatures from which the randomly selected signature is randomly selected.

7. The mobile station apparatus according to claim 1, wherein
the information is addressed only to the mobile station apparatus.

8. The mobile station apparatus according to claim 1, wherein
the signature in the information is the only signature in the information, and
the signature is the dedicated signature or the signature not reserved as a dedicated signature.

9. A base station apparatus comprising:
processing circuitry configured to transmit to a single mobile station apparatus information that includes a signature for requesting the single mobile station apparatus to select a random access method and to perform a random access according to the random access method;
wherein a dedicated signature is set to the signature included in the information when requesting the single mobile station apparatus to select the random access method and to perform the random access according to the selected random access method by using the dedicated signature; and
wherein a signature not reserved as a dedicated signature is set to the signature included in the information when requesting the single mobile station apparatus to select the random access method and to perform the random access according to the selected random access method by using a randomly selected signature.

10. The base station apparatus according to claim 9, wherein
the information further includes an uplink synchronization request.

11. The base station apparatus according to claim 2, wherein
the randomly selected signature is selected by the single mobile station apparatus.

12. The base station apparatus according to claim 9, wherein
in the case that the signature not reserved as a dedicated signature is included in the information, the information does not include further information, and the signature not reserved as a dedicated signature is included in the information in place of the dedicated signature.

13. The base station apparatus according to claim 9, wherein
the dedicated signature, the randomly selected signature and the signature not reserved as a dedicated signature each stem from a same set of 64 signatures.

14. The base station apparatus according to claim 9, wherein
the signature not reserved as a dedicated signature does not define a maximum signature of a set of signatures from which the randomly selected signature is randomly selected.

15. The base station apparatus according to claim 2, wherein
the information is addressed only to the single mobile station apparatus.

16. The base station apparatus according to claim 9, wherein
the signature in the information is the only signature in the information, and
the signature is the dedicated signature or the signature not reserved as a dedicated signature.

17. A method performed by a base station apparatus, the method comprising:
transmitting to a single mobile station apparatus, information that includes a signature for requesting the single mobile station apparatus to select a random access method and to perform a random access according to the selected random access method;
setting a dedicated signature to the signature included in the information when requesting the single mobile station apparatus to select the random access method and to perform the random access according to the selected random access method by using the dedicated signature; and
setting a signature not reserved as a dedicated signature to the signature included in the information when requesting the single mobile station apparatus to select the random access method and to perform the random access according to the selected random access method by using a randomly selected signature.

18. A method performed by a mobile station apparatus, the method comprising:
selecting a random access method in response to receiving, from a base station apparatus, information that includes a signature, and
performing a random access according to the selected random access method,
wherein the random access according to the selected random access method is performed by using a dedicated signature when the dedicated signature is detected by the mobile station apparatus as being the signature in the information, and
wherein the random access according to the selected random access method is performed by using a randomly selected signature when a signature not reserved as a dedicated signature is detected by the mobile station apparatus as being the signature in the information.

\* \* \* \* \*